US009664106B2

(12) United States Patent
Chiang

(10) Patent No.: US 9,664,106 B2
(45) Date of Patent: May 30, 2017

(54) ROTARY COMBUSTION ENGINE SYSTEM HAVING TOROIDAL COMPRESSION AND EXPANSION CHAMBERS

(71) Applicant: Ted Nae-Kuan Chiang, Ellicott City, MD (US)

(72) Inventor: Ted Nae-Kuan Chiang, Ellicott City, MD (US)

( * ) Notice: Subject to any disclaimer, the term of this patent is extended or adjusted under 35 U.S.C. 154(b) by 77 days.

(21) Appl. No.: 14/623,891

(22) Filed: Feb. 17, 2015

(65) Prior Publication Data

US 2017/0101926 A1 Apr. 13, 2017

(51) Int. Cl.
*F02B 53/02* (2006.01)
*F01C 9/00* (2006.01)
*F01C 1/00* (2006.01)
*F01C 1/02* (2006.01)
*F04C 18/00* (2006.01)
*F02B 55/02* (2006.01)

(52) U.S. Cl.
CPC .............. *F02B 53/02* (2013.01); *F02B 55/02* (2013.01)

(58) Field of Classification Search
CPC .......... F02B 53/02; F02B 53/00; F02B 55/02; F01C 1/44
USPC .... 123/245, 241, 242, 18 A, 18 R; 418/61.2, 418/268, 35–38
See application file for complete search history.

(56) References Cited

U.S. PATENT DOCUMENTS 869,050 A * 10/1907 Blackmer ........... F01C 21/0863
418/269
1,095,034 A * 4/1914 Anderson ............... F01C 1/077
418/36
1,400,255 A * 12/1921 Anderson ................ F01C 1/44
123/18 R
1,605,912 A * 11/1926 Berntsen .................. F01C 1/44
123/236
1,636,799 A * 7/1927 Berntsen ................ F02B 53/00
123/241
1,695,888 A 12/1928 Dowdey
1,732,995 A 10/1929 Tschudi
(Continued)

FOREIGN PATENT DOCUMENTS

DE 2546817 A1 * 4/1977 ................ F01C 1/46
WO WO 2011126835 A2 * 10/2011 ............. F02B 53/02

*Primary Examiner* — Thai Ba Trieu
(74) *Attorney, Agent, or Firm* — Rosenberg, Klein & Lee

(57) ABSTRACT

A rotary combustion engine system is provided with compression unit and expansions unit offset which communicate through a transfer port. Each unit defines a toroidal chamber extending annularly about a central cavity, and a plurality of curved pistons displaced within the toroidal chamber to variably form a plurality of sub-chambers therein. A rotor member in each unit is eccentrically coupled to a mechanical member and linked by a plurality of swing rod members to the curved pistons. The curved pistons of the expansion unit are advanced by recursive combustion within sub-chambers defined therebetween, to drive angular displacement of the rotor member. The rotor member in the compression unit is angularly displaced with the mechanical member to incrementally advance the unit's curved pistons for recursive compression of air within sub-chambers defined therebetween. The compressed air is recursively passed through the transfer port to the sub-chambers of the expansion unit for combustion.

20 Claims, 27 Drawing Sheets

SEC-EE

(56) References Cited

U.S. PATENT DOCUMENTS

| | | | | |
|---|---|---|---|---|
| 1,877,250 | A | * | 9/1932 | Meyer ............... F01C 1/44 123/235 |
| 1,909,880 | A | * | 5/1933 | Meyer ............... F01C 1/44 123/235 |
| 2,124,327 | A | * | 7/1938 | Wolstenholme ........ F01C 1/07 418/36 |
| 2,248,639 | A | * | 7/1941 | Reinhold ............ F01C 20/12 123/44 D |
| 2,413,589 | A | * | 12/1946 | Snyder .............. F01C 1/07 123/245 |
| 3,034,486 | A | | 5/1962 | Buxton |
| 3,228,183 | A | * | 1/1966 | Fritz ............... F02B 53/00 123/205 |
| 3,412,930 | A | * | 11/1968 | Wanner .............. F04C 18/07 418/37 |
| 3,580,228 | A | * | 5/1971 | Rocha ............... F01C 9/002 123/18 A |
| 3,726,259 | A | * | 4/1973 | Graves .............. F02B 53/00 123/236 |
| 3,807,368 | A | | 4/1974 | Johnson |
| 3,822,971 | A | | 7/1974 | Chahrouri |
| 3,829,257 | A | * | 8/1974 | Goering ............. F01C 1/07 418/36 |
| 3,858,557 | A | * | 1/1975 | Myers ............... F02B 53/08 123/213 |
| 3,871,337 | A | * | 3/1975 | Green ............... F01C 1/44 123/245 |
| 4,035,111 | A | | 7/1977 | Cronen, Sr. |
| 4,553,513 | A | * | 11/1985 | Miles ............... F01C 11/008 123/204 |
| 5,310,325 | A | | 5/1994 | Gulyash |
| 6,082,324 | A | * | 7/2000 | Liu ................. F01C 1/44 123/235 |
| 6,276,329 | B1 | | 8/2001 | Archer |
| 6,895,922 | B1 | | 5/2005 | Stoughton |
| 7,255,086 | B2 | | 8/2007 | Kovalenko |
| 7,600,490 | B2 | * | 10/2009 | Reisser ............. F02B 53/02 123/18 A |
| 7,827,956 | B2 | | 11/2010 | Ambardekar |
| 7,845,332 | B2 | * | 12/2010 | Wang ................ F01C 1/46 123/241 |
| 8,662,052 | B2 | * | 3/2014 | Garside ............. F02B 53/00 123/245 |
| 8,689,764 | B2 | * | 4/2014 | Horn ................ F02B 53/04 123/242 |
| 8,919,322 | B2 | * | 12/2014 | Cunningham ........ F02B 53/02 123/245 |
| 2007/0199537 | A1 | | 8/2007 | Morgado |
| 2011/0239981 | A1 | * | 10/2011 | Cunningham ........ F02B 53/02 123/245 |
| 2013/0089447 | A1 | * | 4/2013 | Yao ................. F02B 53/00 418/54 |
| 2014/0345562 | A1 | * | 11/2014 | Horstin ............. F02B 53/00 123/215 |
| 2015/0128896 | A1 | * | 5/2015 | Cunningham ........ F02B 53/02 123/245 |
| 2016/0061037 | A1 | * | 3/2016 | Liu ................. F01C 1/44 123/241 |

\* cited by examiner

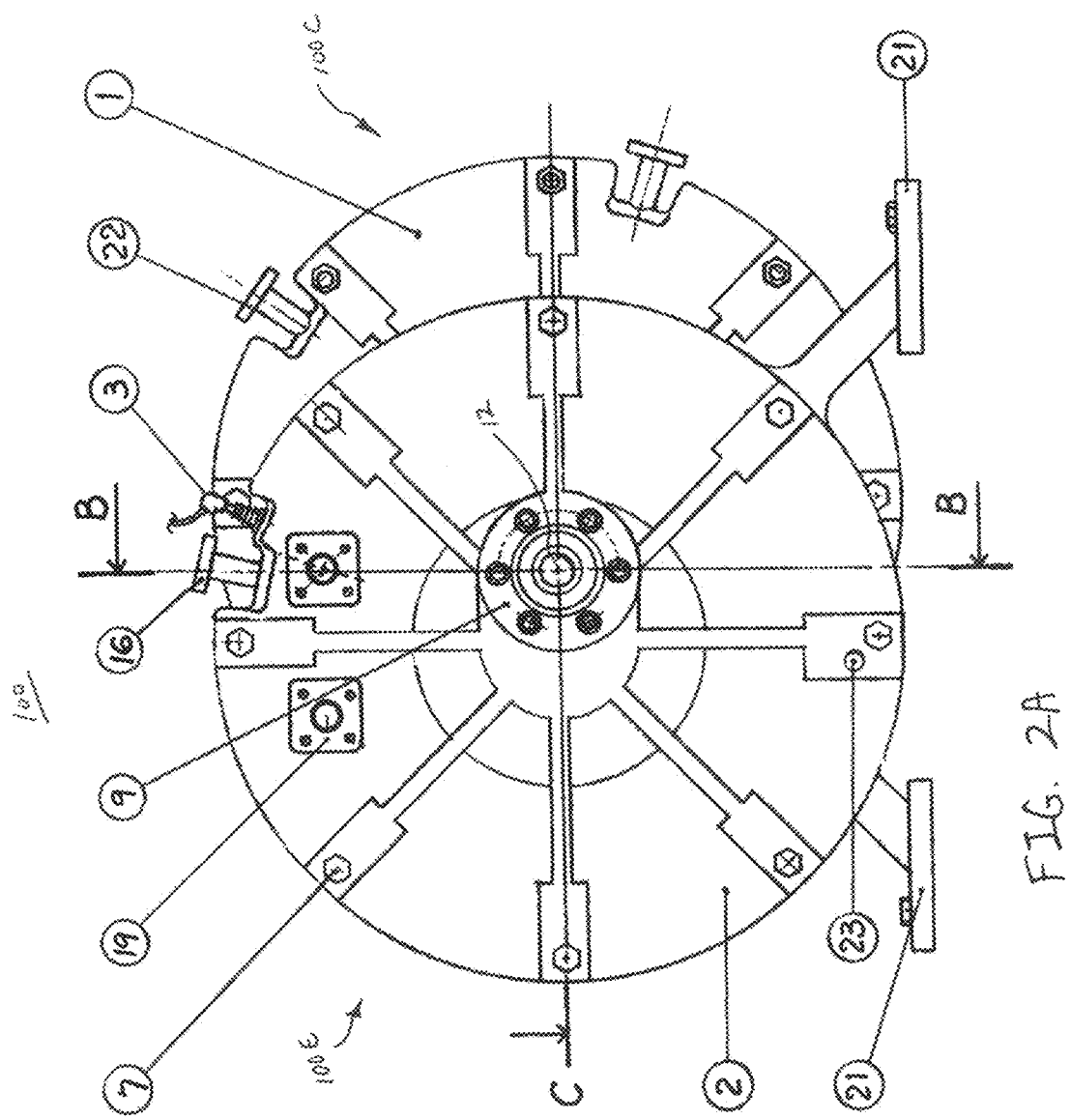

SEC-BB

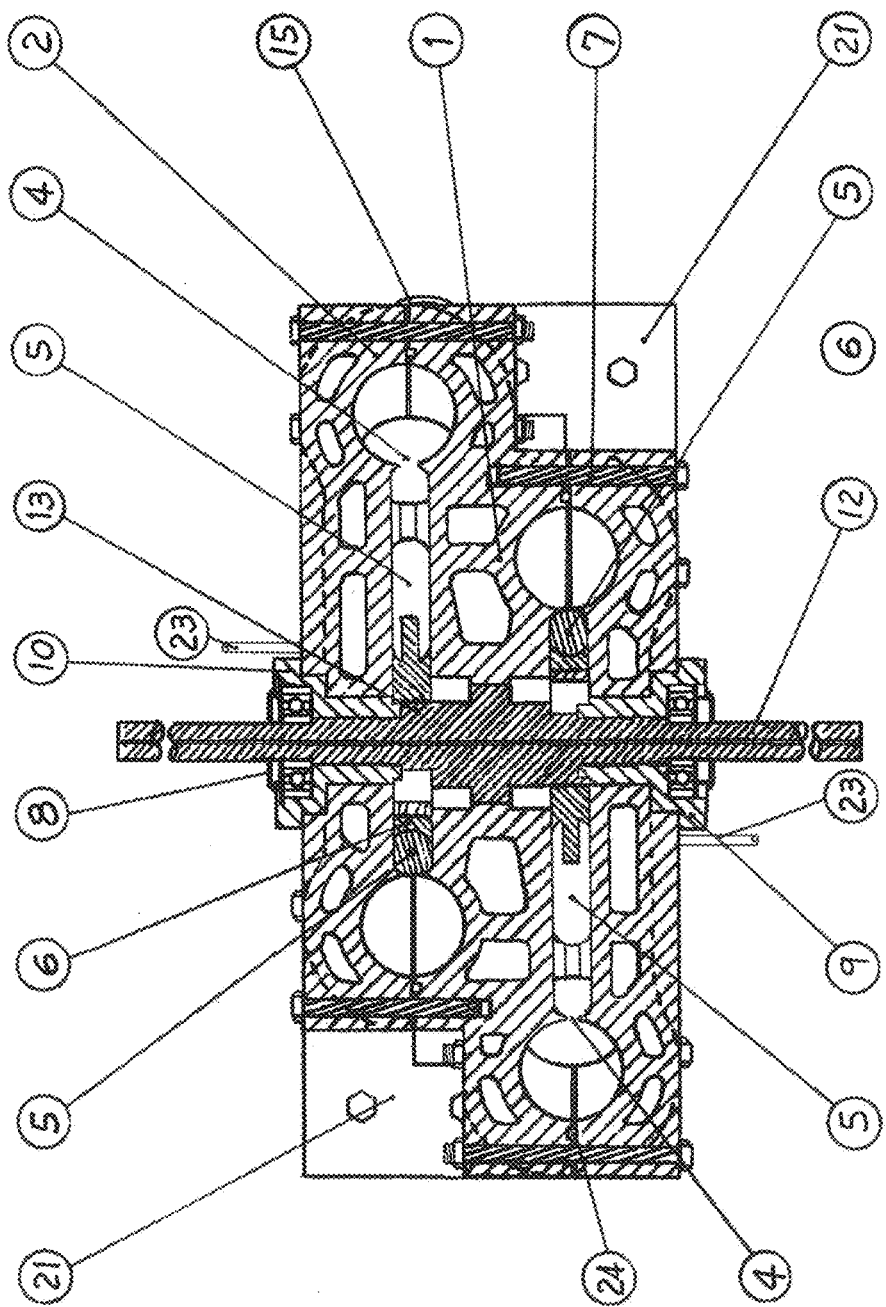

SEC-DD

SEC-EE

SEC-FF

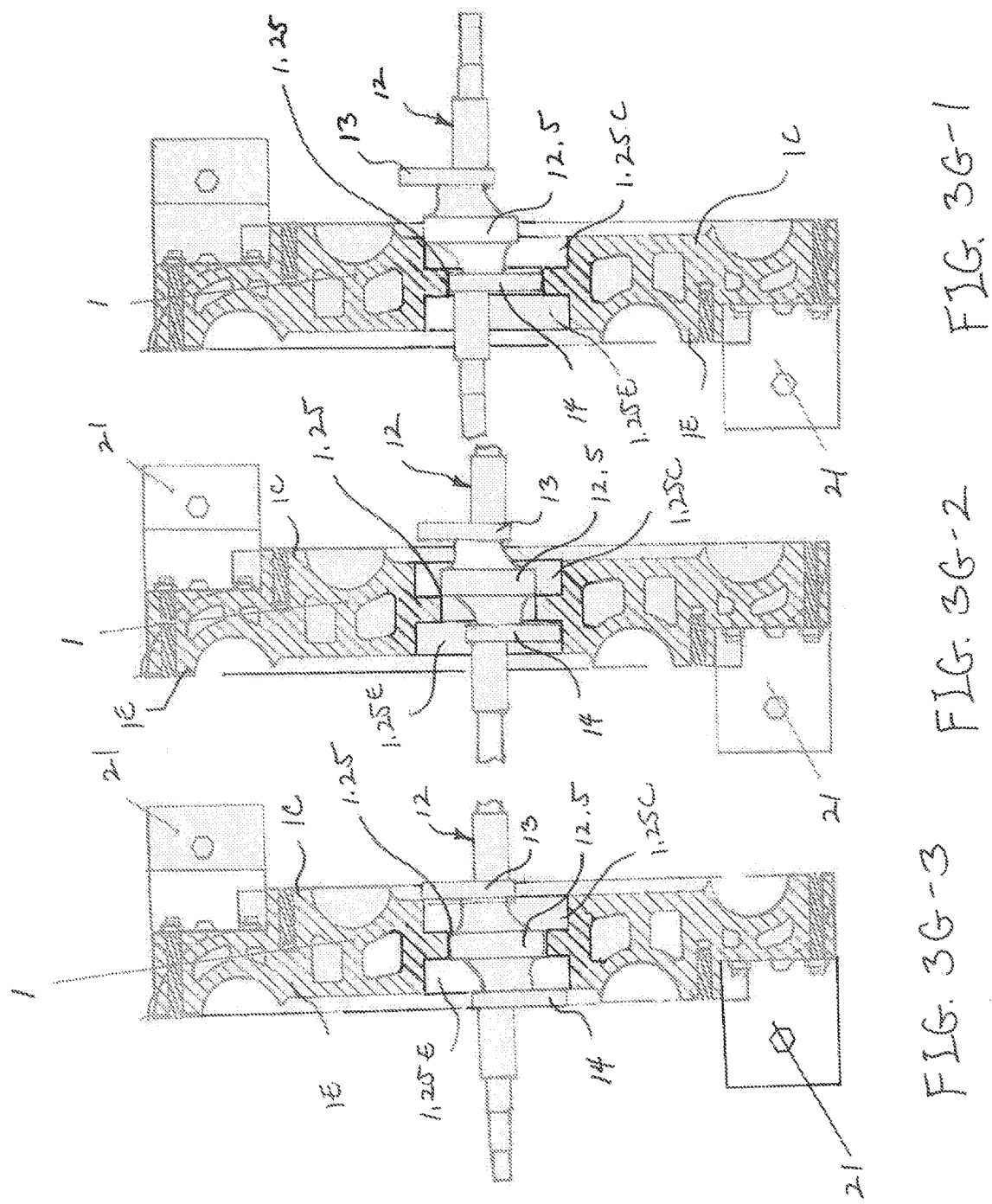

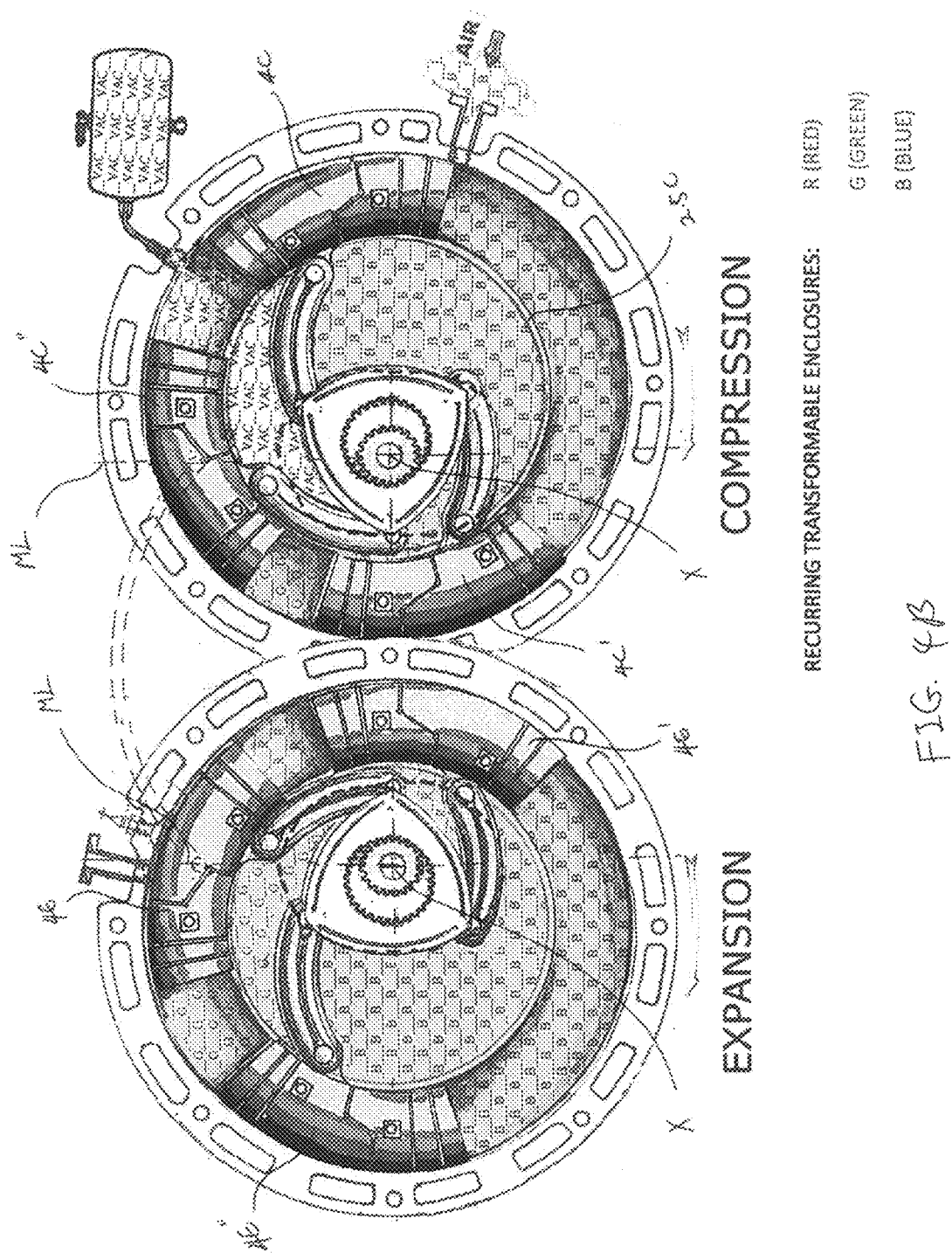

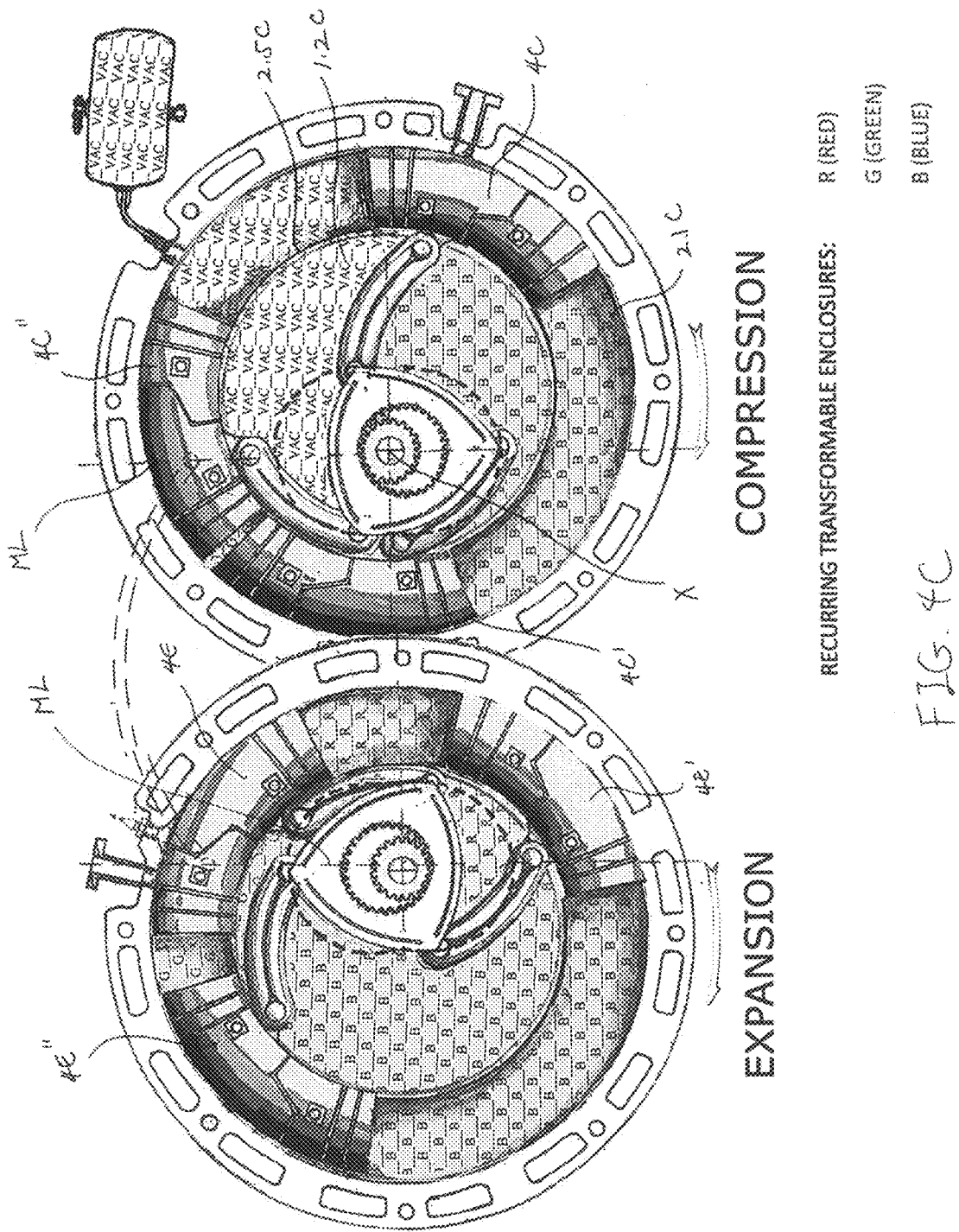

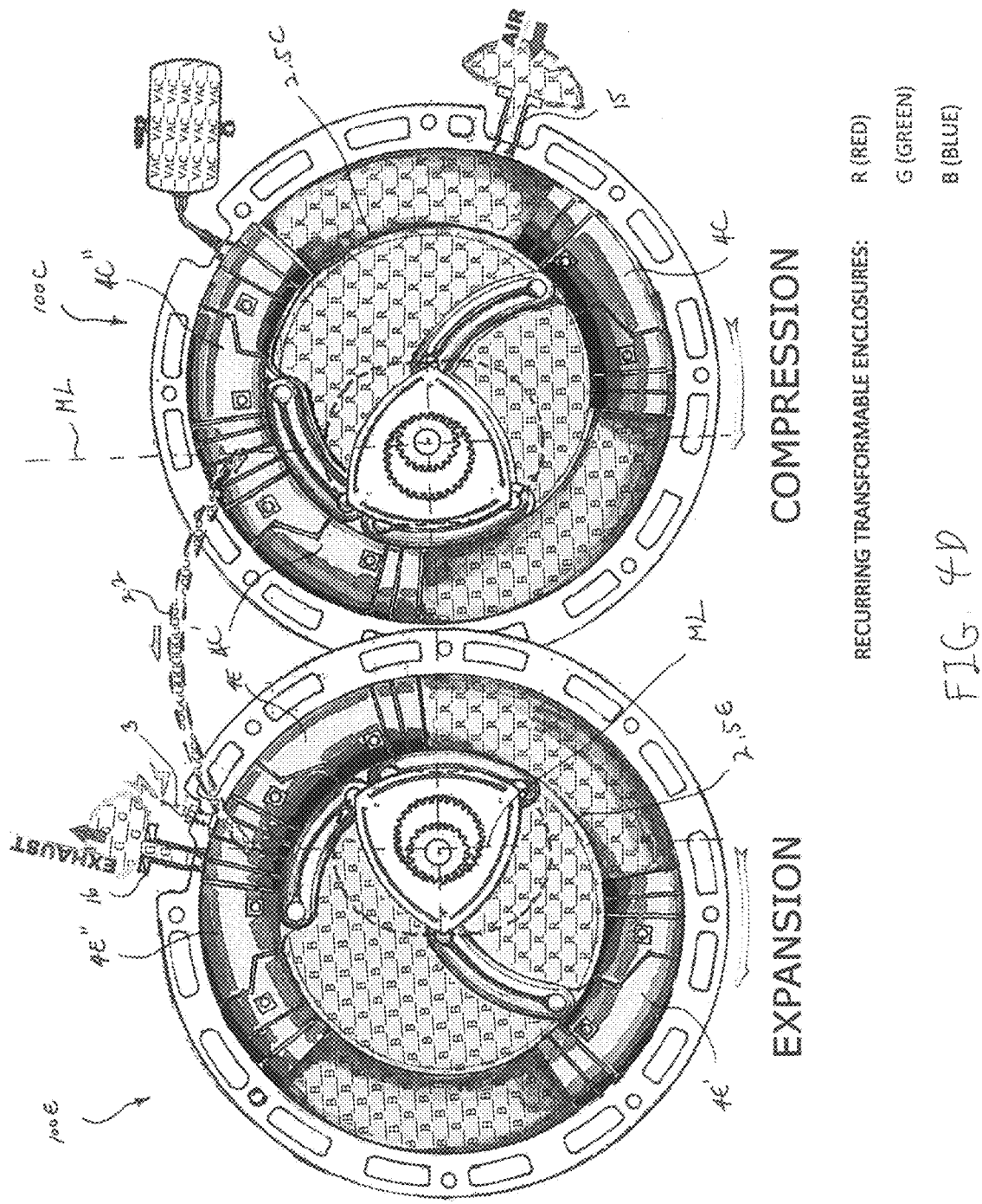

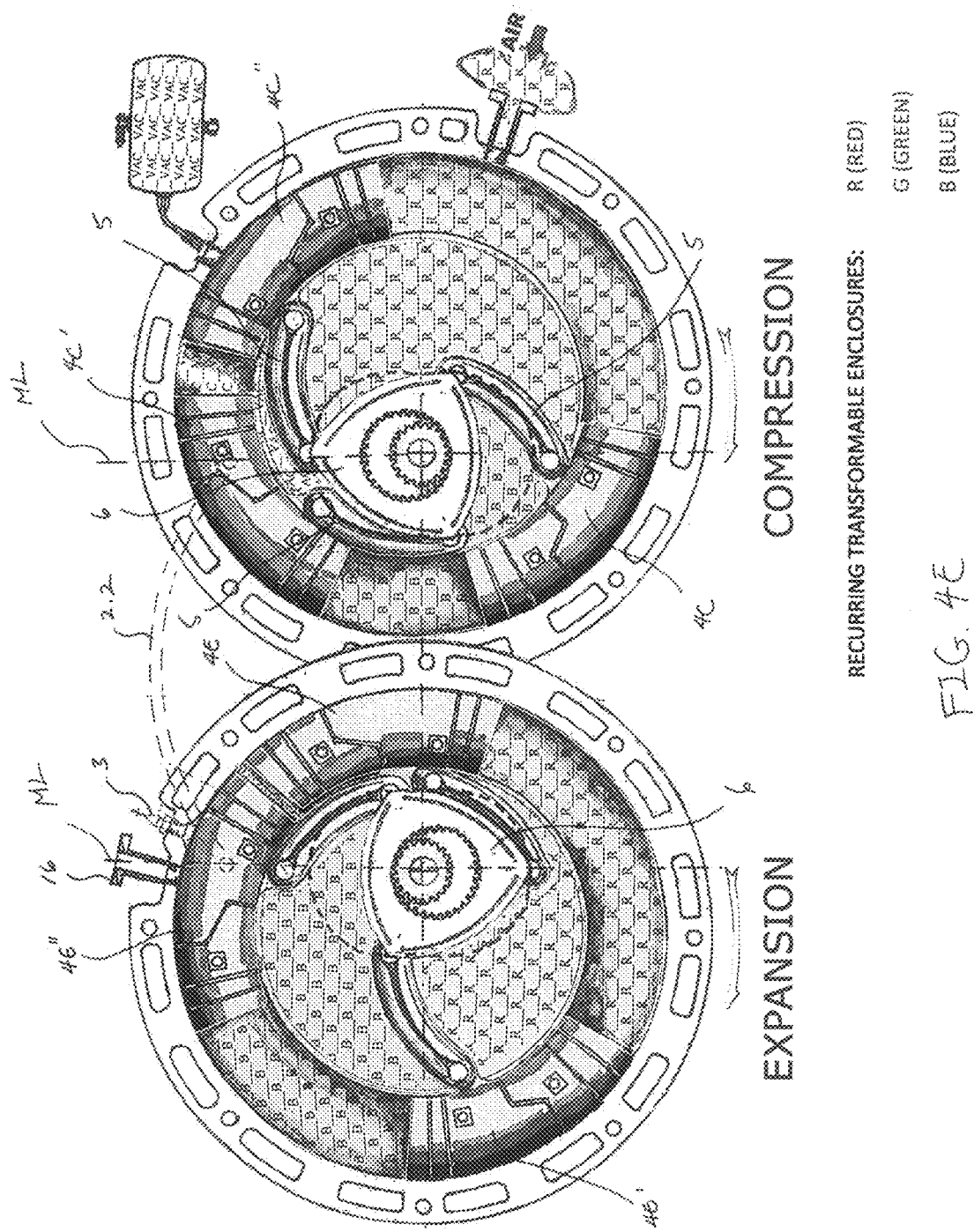

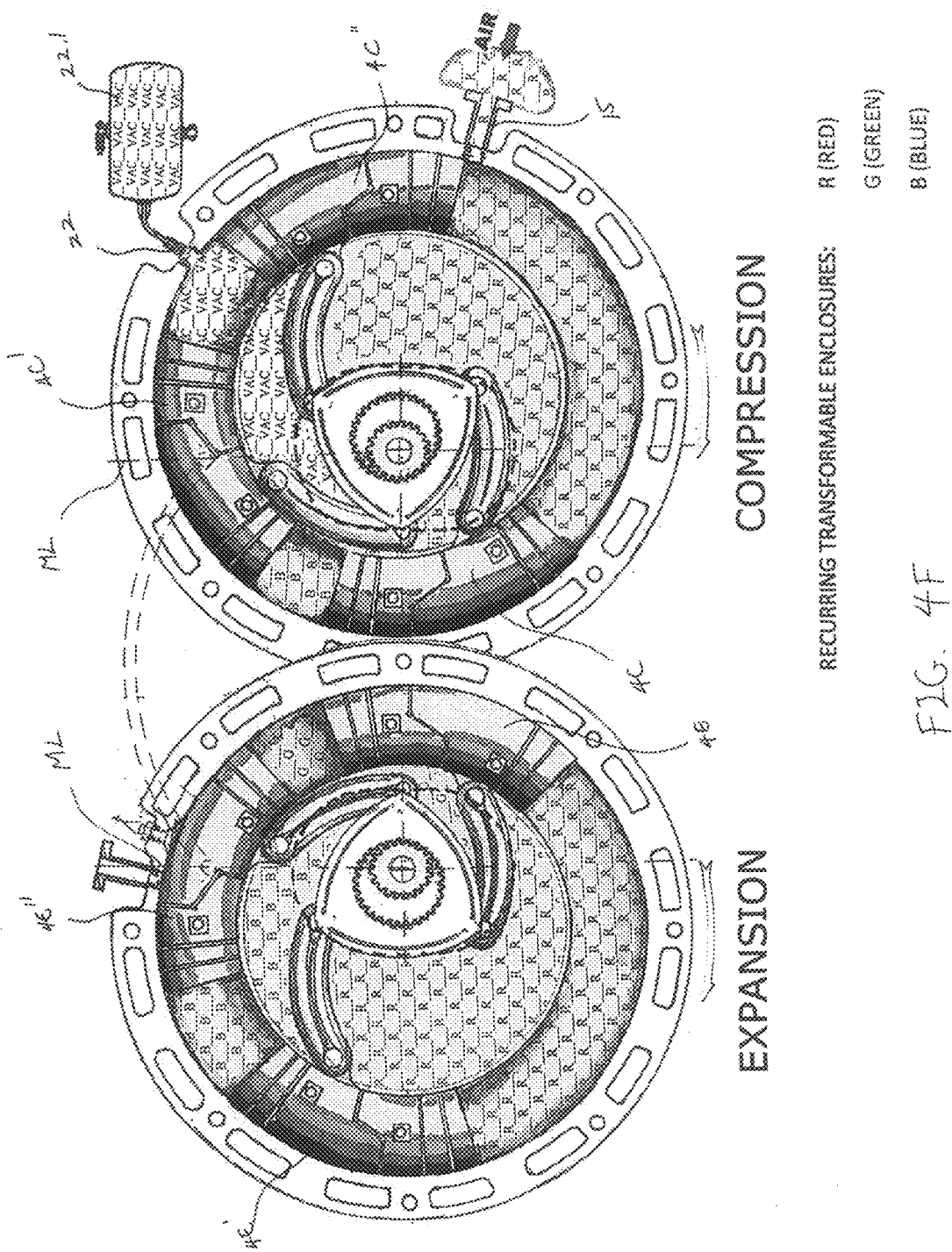

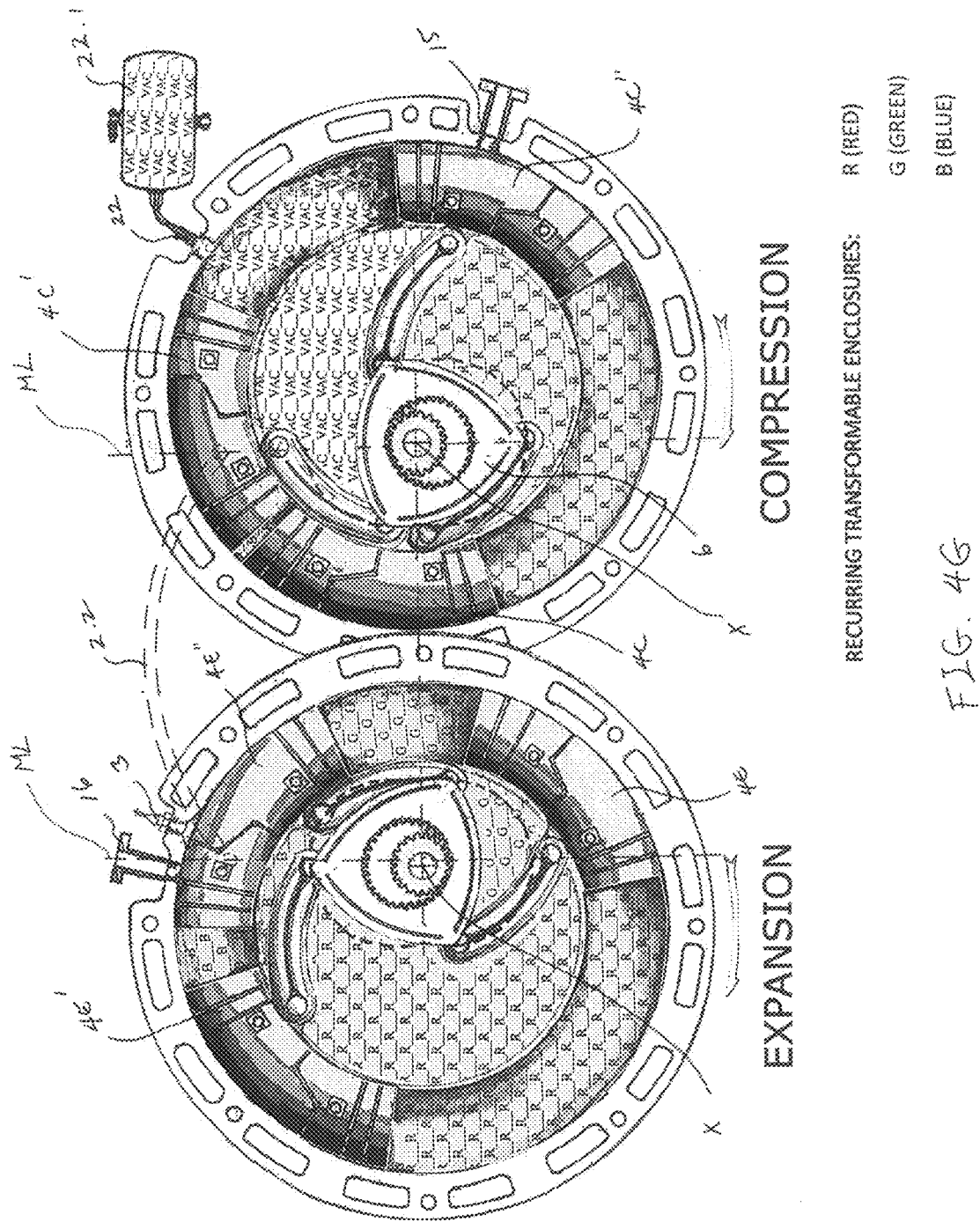

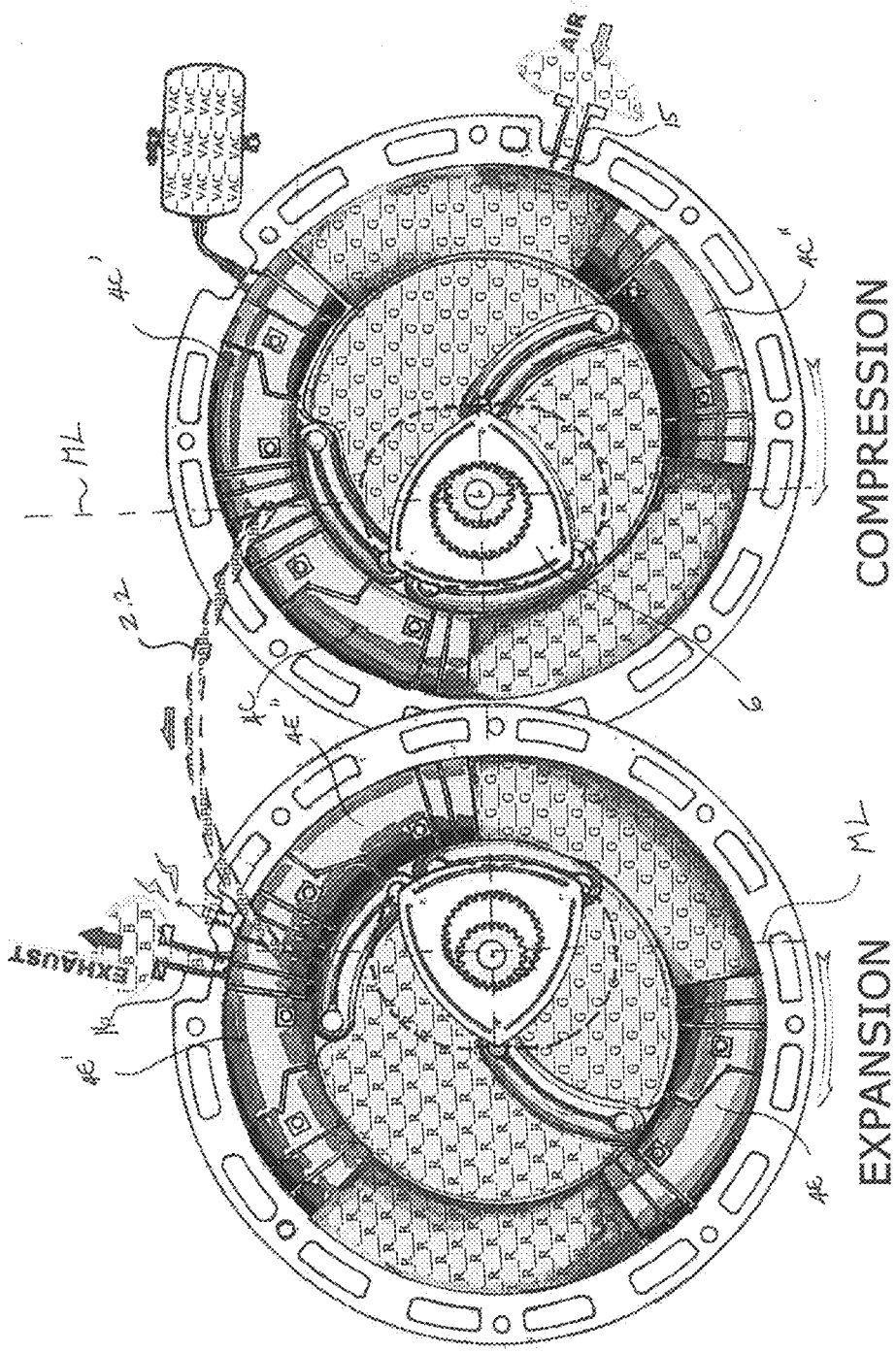

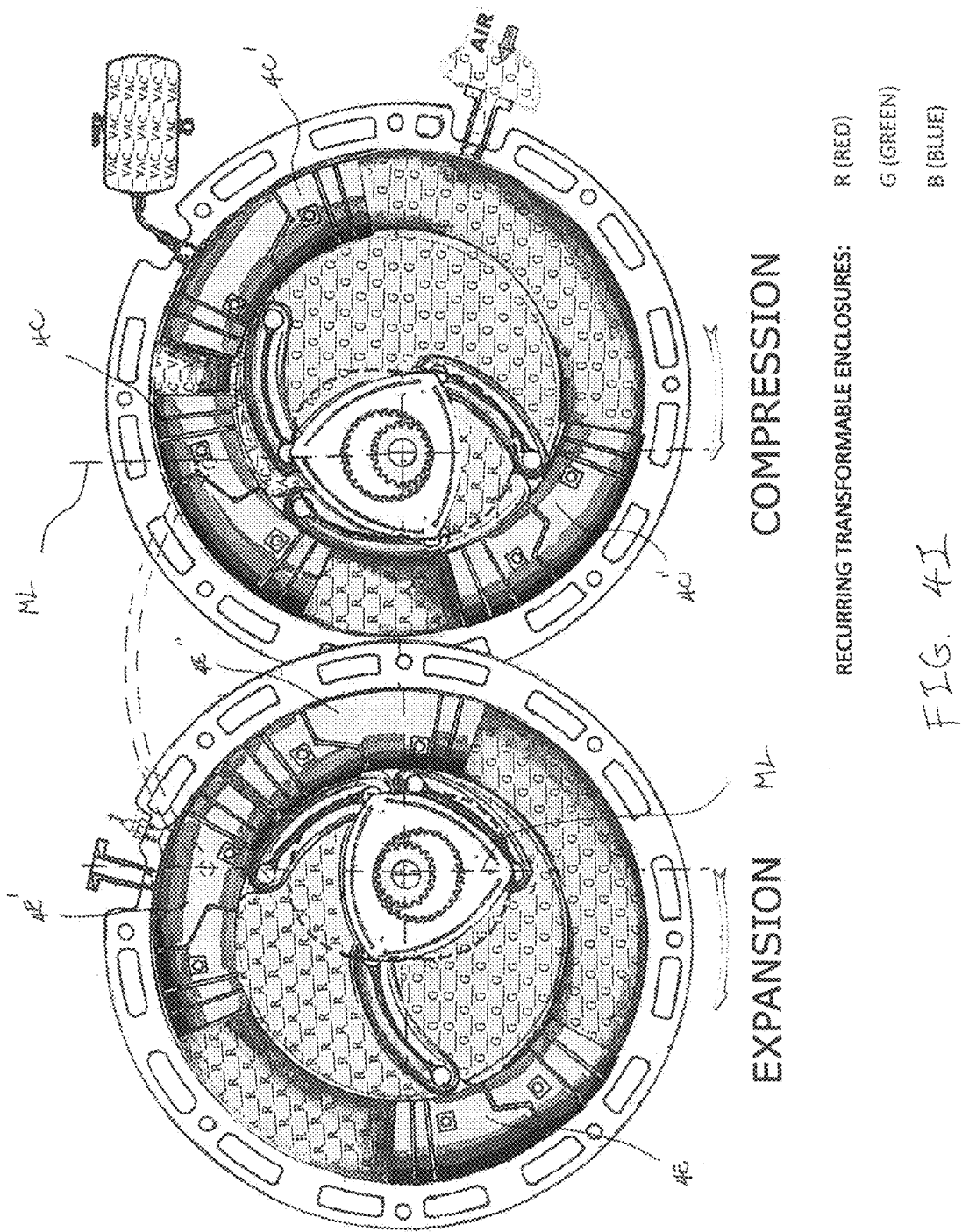

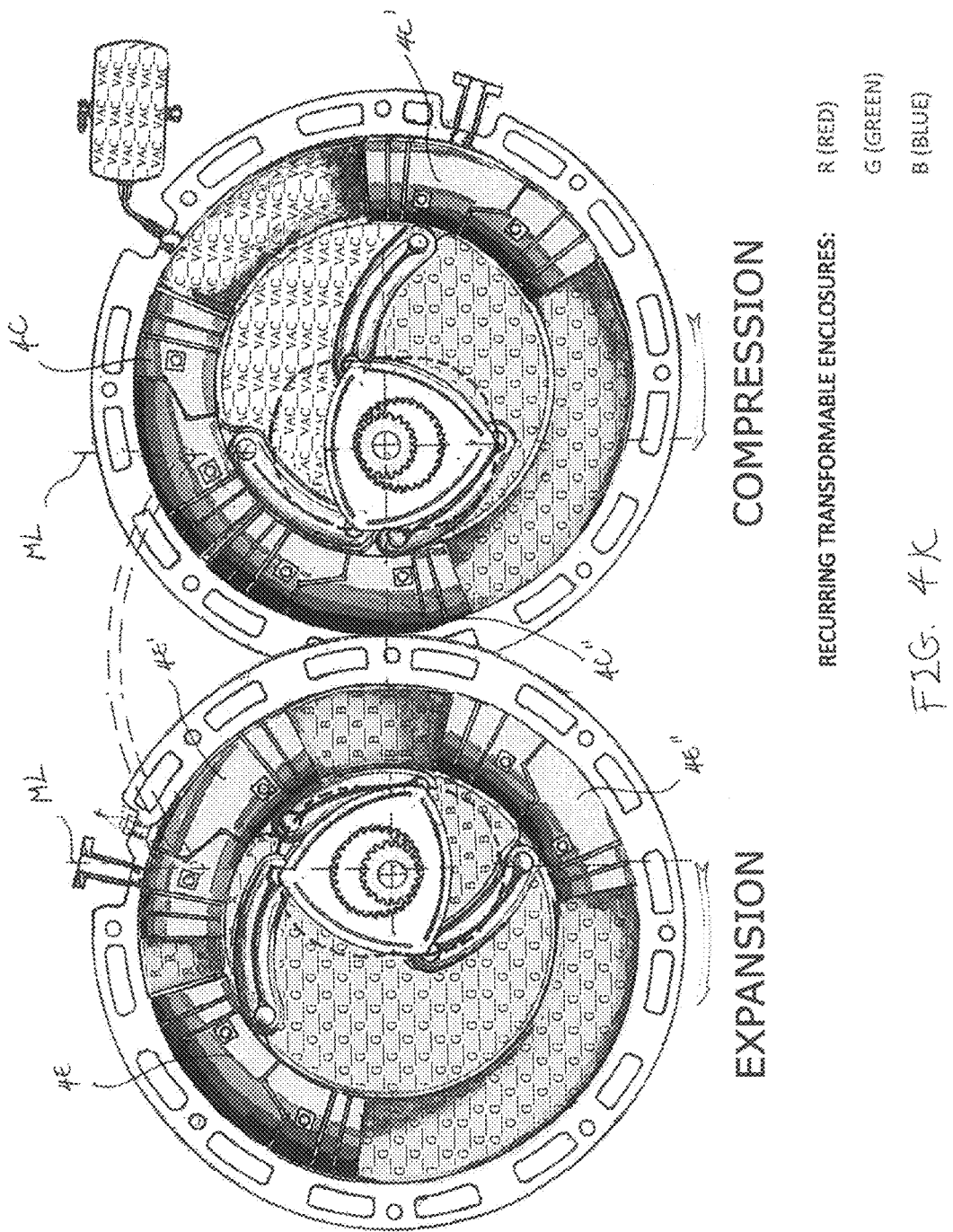

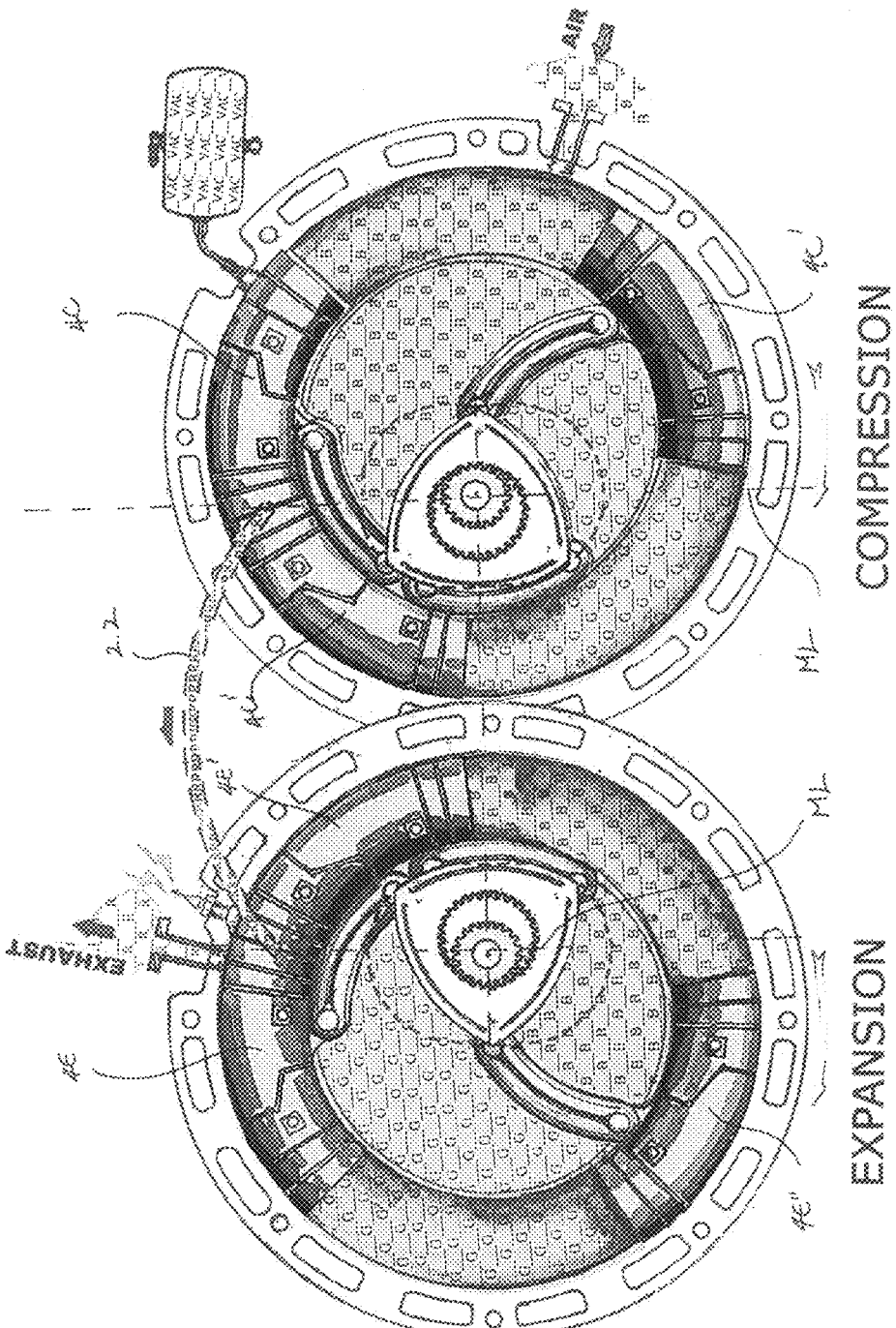

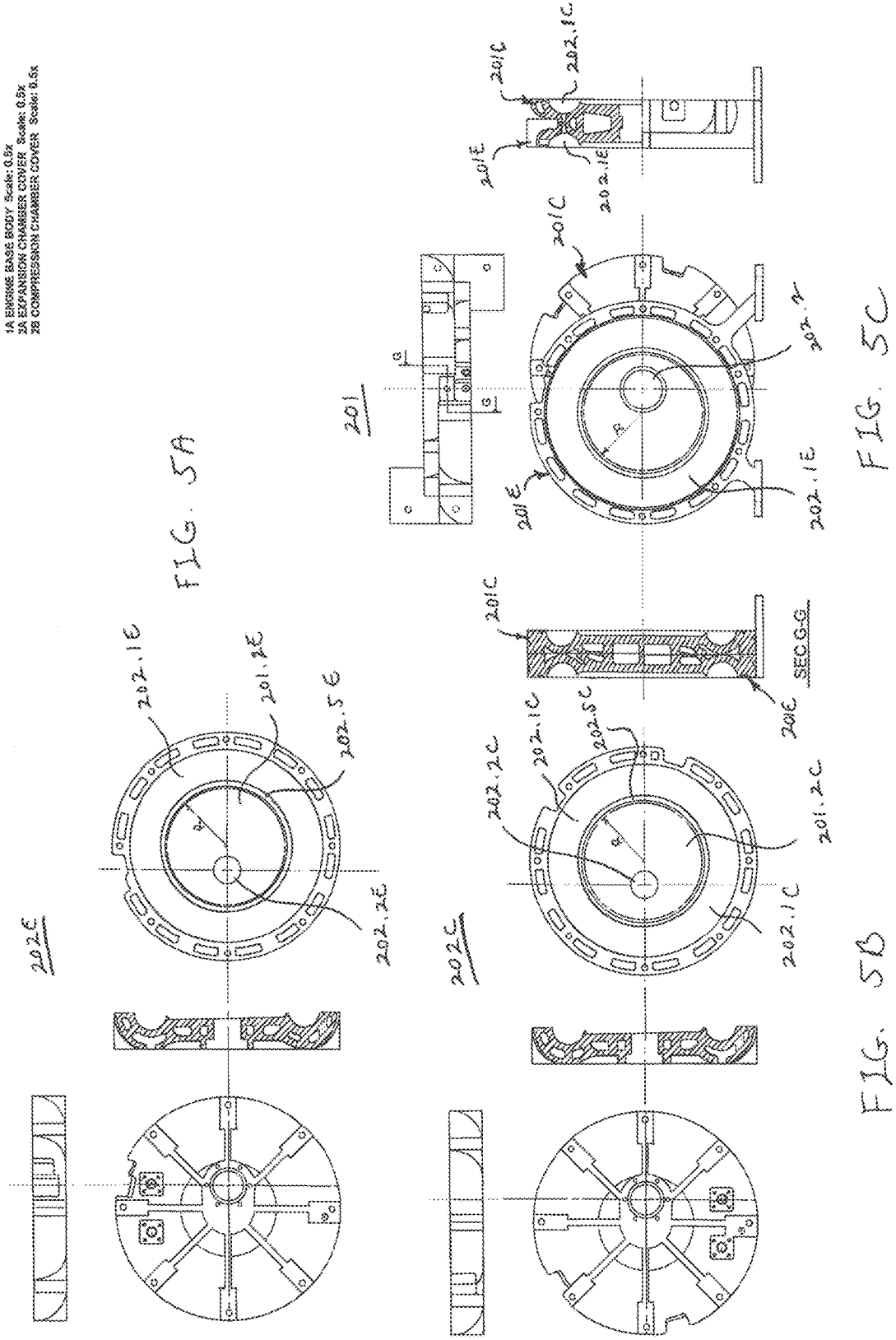

ROTARY COMBUSTION ENGINE SYSTEM HAVING TOROIDAL COMPRESSION AND EXPANSION CHAMBERS

BACKGROUND OF THE INVENTION

The present invention is generally directed to a rotary combustion engine having rotary compression and expansion units. More specifically, the present invention is directed to a rotary internal combustion engine whose compression and expansion units define separate toroidal chambers for the volume compression and expansion operations requisite to internal combustion drive of a mechanical member. The rotary combustion engine provides for the coordinated symbiotic interaction of its internal combustion and expansion units to recursively drive, for example, a crank shaft eccentrically coupled thereto.

Rotary combustion engines have been long known and used in the art in automobile and other power generating applications. One example is the so-called Wankel engine in which a rotor contained internally within an oblong chamber of an engine housing, which undergoes eccentric rotation within the chamber to sequentially trap, compress, then combust pockets of air therein. The rotor is carried on an eccentric crank shaft, and defines three apex points which slidably bear against the surrounding inner walls of the chamber. As it goes through one phase of eccentric rotation with the crank shaft, the rotor—between two of its apex points—traps a volume of intake air against the inner wall of the chamber. As the rotor advances in its eccentric rotation, the trapped air is compressed in volume. During a subsequent phase of the rotor's eccentric rotation, the compressed air is ignited for combustion to explosively expand the trapped volume and thereby drive the rotor's further rotation. The post-combustion gas is thereafter exhausted out of the chamber, and upon continued eccentric rotation of the rotor, further cycles of trapping, compressing, and igniting of a fresh batch of intake air occur.

This well-known rotary engine design suffers from a number of drawbacks. Not the least of these is the dominant central role served by the rotor, which not only conveys and drives crank shaft rotation to the internal compression and expansion processes occurring with the given chamber, but also serves to directly seal off and contain both the compression and expansion volumes within the same chamber. The rotor itself is exposed directly to the explosive combustion, while also serving to maintain the all too critical seals needed for the chamber portions to support the compression, combustion, and expansion operations without compromise. Not surprisingly, rotary engines of this type are known to suffer from lack of durability and unduly limited operational life spans.

There is therefore a need for a rotary internal combustion engine which provides for simple yet efficient and durable operation to recursively drive a mechanical member such as a crank shaft. There is a need for such rotary combustion engine which provides reliable operation over an extended service life.

SUMMARY OF THE INVENTION

It is an object of the present invention to provide a rotary combustion engine that simply yet efficiently and durably generates recursive mechanical drive power.

It is another object of the present invention to provide a rotary combustion engine that operates reliably over an extended service life.

These and other objects are attained in a rotary combustion engine system including an axially extended mechanical member, at least one compression unit, and at least one expansion unit offset therefrom. The compression and expansion units communicate through a transfer port defined therebetween, with the compression unit having at least one air intake coupling and the expansion unit having at least one exhaust coupling. Each of the compression and expansion units includes a cylinder portion defining a toroidal chamber that extends annularly about a central cavity, and includes a plurality of curved pistons disposed within the toroidal chamber to be displaceable relative to one another therein. The curved pistons variably partition the toroidal chamber into a plurality of sub-chambers sealed one from the other. Each of the compression and expansion units further includes a rotor member disposed within the central cavity of the cylinder portion eccentrically coupled to the mechanical member and linked by a plurality of swing rod members to the curved pistons. The curved pistons of the expansion unit are incrementally advanced through the toroidal chamber by recursive combustion within the sub-chambers defined therebetween. The rotor member of the expansion unit is angularly displaced responsive to the advancement of the curved pistons for incrementally driving rotation of the mechanical member about an axis thereof. The rotor member of the compression unit is angularly displaced responsive to the rotation of the mechanical member to incrementally advance the curved pistons through the toroidal chamber for recursive compression of air within the sub-chambers defined therebetween. The compressed air is recursively passed through the transfer port to the sub-chambers of the expansion unit.

A rotary combustion engine system formed in accordance with certain embodiments of the present invention comprises an axially extended crank shaft, along with at least one compression unit and at least one expansion unit disposed within a housing assembly. The compression and expansion units communicate through a transfer port defined therebetween, with the compression unit having at least one air intake port, and the expansion unit having at least one exhaust port and at least one spark plug coupling. Each of the compression and expansion units includes a cylinder portion defining a toroidal chamber extending annularly about a central cavity. A plurality of curved pistons are disposed within the toroidal chamber in separately displaceable manner, which curved pistons variably partition the toroidal chamber into a plurality of sub-chambers sealed one from the other. Each of the compression and expansion units also includes a rotor member disposed within the central cavity of the cylinder portion eccentrically coupled to the crank shaft and linked by a plurality of swing rod members to the curved pistons. The rotor member includes a rotor gear portion. A plurality of bearing supports extends through the housing assembly and respectively into the central cavities of the compression and expansion units to coaxially receive and rotatably support the crank shaft. Each of the bearing supports defines a stationary gear portion engaging the rotor gear portion of one rotor member to guide eccentric cycloidal displacement thereof about an axis of the crank shaft passing through the central cavities of the compression and expansion units. The toroidal chamber of the compression unit is axially and radially offset from the toroidal chamber of the expansion unit, with the curved pistons of the expansion unit being incrementally advanced through the toroidal chamber by recursive combustion within the sub-chambers defined therebetween. The rotor member of the expansion unit is angularly displaced responsive to the advancement of the curved pistons for incrementally driving rotation of the crank shaft about an axis thereof. The rotor member of the compression unit is angularly displaced responsive to the rotation of the crank shaft to incrementally advance the curved pistons through the toroidal chamber for recursive compression of air within the sub-chambers defined therebetween. The compressed air is recursively passed through the transfer port to one of the sub-chambers of the expansion unit for combustion thereat.

A rotary internal combustion engine system formed in accordance with certain other embodiments of the present invention comprises an axially extended crank shaft, at least one compression unit, and at least one expansion unit offset therefrom. The compression and expansion units communicate through a transfer port defined therebetween, with the compression unit having at least one air intake coupling, and the expansion unit having at least one exhaust coupling. Each of the compression and expansion units includes a cylinder portion defining a toroidal chamber extending annularly about a central cavity, and a plurality of curved pistons disposed within the toroidal chamber to be displaceable relative to one another therein. The curved pistons variably partition the toroidal chamber into a plurality of sub-chambers sealed one from the other. Each of the compression and expansion units further includes a rotor member disposed outside the toroidal chamber of the cylinder portion, with the rotor member being eccentrically coupled to the crank shaft and linked by articulated swing rod members to the curved pistons. The curved pistons of the expansion unit are incrementally advanced through the toroidal chamber by recursive combustion within the sub-chambers defined therebetween. The rotor member of the expansion unit is angularly displaced responsive to displacement of the curved pistons within the unit's toroidal chamber for incrementally driving rotation of the crank shaft about an axis thereof. The rotor member of the compression unit is angularly displaced responsive to the rotation of the crank shaft to incrementally displace the curved pistons within the toroidal chamber for recursive compression of air within the sub-chambers defined therebetween, the compressed air being recursively passed through the transfer port to the sub-chambers of the expansion unit.

BRIEF DESCRIPTION OF THE DRAWINGS

FIG. 2A is a front elevational view of a portion of the embodiment as illustrated in FIG. 1;

FIG. 3C is a sectional view taken along line C-C of the portion of the system illustrated in FIG. 2B;

FIG. 3G-1-3G-3 show a series of sectional views, partially cut away, of a portion of the system, illustrating one example of axial installation for a crank shaft in the system embodiment of FIG. 1;

FIGS. 4A-4L show a series of time displaced schematic diagrams illustrating the recursive operation of compression and expansion units in the system embodiment of FIG. 1 once the internal combustion operation of the system has been started;

FIG. 5A shows respective plan, outer elevational, sectional, and inner elevational views of an expansion unit's cylinder housing cover component in isolation, as formed in accordance with another exemplary embodiment of the present invention;

FIG. 5B shows respective plan, outer elevational, sectional, and inner elevational views of a compression unit's cylinder housing cover component in isolation, as formed in accordance with another exemplary embodiment of the present invention;

FIG. 5C shows respective plan, outer elevational, sectional, and inner elevational views of a main cylinder housing component in isolation, as formed in accordance with another exemplary embodiment of the present invention;

DETAILED DESCRIPTION OF THE PREFERRED EMBODIMENTS

Figure 1:
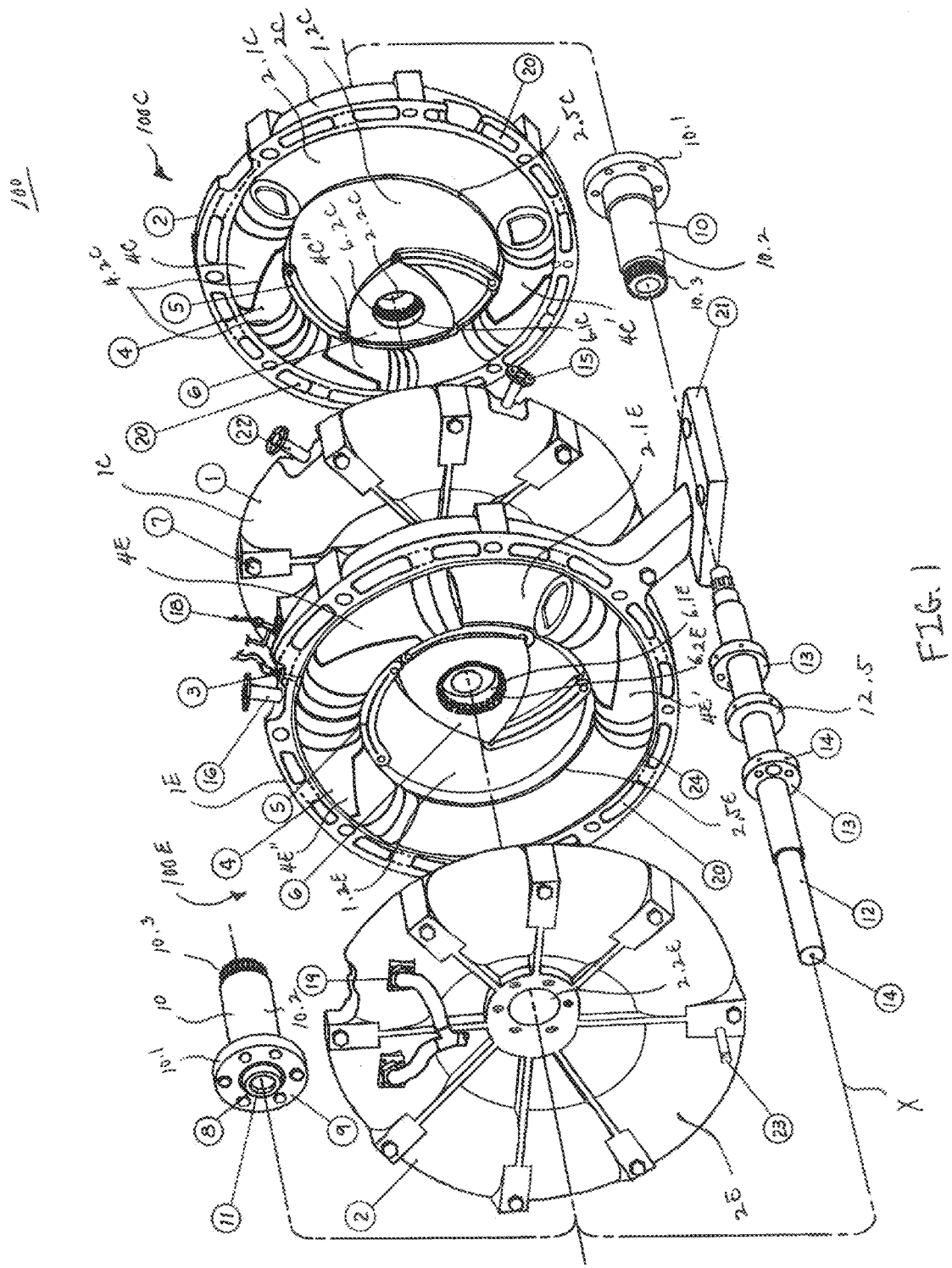
FIG. 1 is an exploded perspective view of a system 100 formed in accordance with one exemplary embodiment of the present invention.

Generally, a system formed in accordance with certain exemplary embodiments of the present invention provides for a rotatory internal combustion engine having at least one compression unit and at least one expansion unit. The compression and expansion units are commonly coupled to a mechanical member for conveying the drive power generated by the engine, such as an axially extended crank shaft for instance. The compression and expansion units define separate toroidal chambers which contain a plurality of displaceable curved pistons between which sub-chambers of variably expanded and compressed volume are formed.

In each compression unit, rotation of the crank shaft causes responsive displacement of the curved pistons within its toroidal chamber such that volumes of air introduced into successive sub-chambers are progressively compressed between neighboring pairs of curved pistons before being transferred to an expansion unit. In the expansion unit, the compressed air is received in a sub-chamber defined between a neighboring pair of curved pistons within that unit's toroidal chamber. The compressed air is there ignited upon suitable injection of fuel to cause explosive combustion within that expansion sub-chamber. The combustion causes the sub-chamber's volume to responsively expand and thereby force apart the curved pistons defining that sub-chamber. The crank shaft is thereby driven to rotate by such displacement of the curved pistons within the expansion unit's toroidal chamber.

This compression-combustion-expansion process is carried out recursively as successive sub-chambers in the compression and expansion units variably and cooperatively interact in this manner. The crank shaft's rotation is coupled to the orbital displacement of the curved pistons within both the compression and expansion units' toroidal chambers by respective rotor assemblies employing articulated linkage measures. The rotor assemblies are configured to provide suitable bidirectional conversion between the crank shaft's axial rotation and the curved pistons' orbital displacement within the compression and expansion units' toroidal chambers.

In accordance with certain aspects of the present invention, the rotor assembly of each compression/expansion unit is formed with a rotor member that turns with the given mechanical member, such as a crank shaft—to either drive the displacement of certain curved pistons (as in the compression unit) or convey the displacing force of certain curved pistons to the crank shaft (as in the expansion unit). The rotor member of each compression/expansion unit remains outside the toroidal chamber defined by (and substantially enclosed by) that unit's cylinder portion. Thus, while the rotor member, along with other components of the rotor assembly, may help to define individual sub-chambers (and seal each sub-chamber off from the other sub-chambers) in each unit, the rotor member remains outside the unit's toroidal chamber. Hence, the rotor member remains outside each sub-chamber. That is, each sub-chamber within the compression and expansion units is reliably and consistently defined within the fixed cylindrical walls surrounding the toroidal chamber.

Turning now to FIG. 1, there is shown an exploded perspective view of a rotary combustion engine system 100 formed in accordance with one exemplary embodiment of the present invention. As illustrated, system 100 includes a compression unit 100C and an expansion unit 100E. Although only one each of the compression and expansion units are employed, additional ones of each unit may be suitably employed in certain other embodiments, depending on the particular requirements of their intended applications. In the exemplary embodiment shown, both the compression unit 100C and expansion 100E are substantially enclosed by a shared housing assembly comprising a dual-sided main/central toroidal cylinder housing 1 and a pair of toroidal cylinder housing covers 2 capping the opposing sides of the central housing 1. The various parts of this housing assembly may be formed of cast iron, aluminum alloy, magnesium alloy, and/or any other suitable material known in the art of sufficient strength, durability, and wear resistance for use in internal combustion engine blocks.

The cylinder portion formed for the compression unit 100C—by joining the main cylinder housing half 1C with the cylinder housing cover 2C—is preferably offset both axially and transaxially (or radially in the illustrated embodiment) from the cylinder housing portion formed for the expansion unit 100E—by joining the opposing main cylinder housing half 1E with the cylinder housing cover 2E. Despite their transaxially offset mutual disposition, the housing components 1C, 2C and 1E, 2E of the compression and expansion units 100C, 100E are respectively formed with through openings aligned to cooperatively pass an axially extended crank shaft 12 therethrough. The crank shaft 12 therefore passes through the housing components of at least one of the compression and expansion units 100C, 100E in eccentric manner. Preferably, the crank shaft 12 passes eccentrically through both of these compression and expansion units 100C, 100E, with the curved pistons and rotor assemblies thereof preferably disposed in complementary, mutually counter balancing orientation and position about an axis X defined by the crank shaft 12. Such counter balancing of rotating/revolving parts minimizes the vibration during operation of the system.

At each of the compression and expansion units 100C, 100E, the cylinder portion formed by the adjoined housing components extends annularly about a central cavity 1.2C, 1.2E. This central cavity 1.2C, 1.2E is enclosed on either side by the side central walls of the joined housing components 1C, 2C and 1E, 2E, except at the aligned through openings formed in those central walls of the joined housing components to pass the crank shaft 12 therethrough. The central cavity 1.2C, 1.2E at each unit 100C, 100E preferably also communicates with the toroidal chamber 2.1C, 2.1E formed inside the cylinder portion, communicating through an annular slot 2.5C, 2.5E preserved between opposed annular surfaces of the adjoining housing components 1C, 2C and 1E, 2E. This annular slot 2.5C, 2.5E provides access for linkage coupling between the given unit's rotor assembly and curved pistons 4C, 4C', 4C" and 4E, 4E', 4E".

The toroidal chamber 2.1C, 2.1E formed between the housing components in each of the compression and expansion units 100C, 100E is sealed in gas-impermeable manner from the surrounding space outside the housing components. The toroidal chamber 2.1C, 2.1E is surrounded by a substantially continuous cylindrical wall collectively formed by the inner surfaces of the joined housing components. The inner cylindrical wall surface continues annularly about the central cavity 1.2C, 1.2E of the given unit, and is preferably interrupted only at the annular slot 2.5C, 2.5E through which the toroidal chamber communicates with the central cavity. This substantially continuous cylindrical profile of the toroidal chamber formed from one side of the annular slot 2.5C, 2.5E to the other make for efficient containment of the sub-chambers framed therein are between consecutive curved pistons.

The plurality of curved pistons 4C, 4C', 4C" within the compression unit's toroidal chamber 2.1C and each of the curved pistons 4E, 4E', 4E" within the expansion unit's toroidal chamber 2.1E are each preferably formed in this embodiment to be substantially identical in structure. Moreover, the total number of curved pistons employed in the compression and expansion units 100C, 100E is preferably also identical, with the distribution of the curved pistons within the compression unit's toroidal chamber 2.1C at any instant in time during system operation preferably being complementary in angular, or orbital, position (relative to the respective axes of the units' toroidal chambers 2.1C, 2.1E). This relationship may be suitably varied depending on the configuration and requirements of the applications particularly intended, but such complementary positioning of the curved pistons having like structure generally tends to optimize counter balancing for stable system operation.

Each of the curved pistons 4C, 4C', 4C", 4E, 4E', 4E" is formed with a generally cylindrical outer contour about an arcuate axis aligned with the annular axis of the given toroidal chamber 2.1C, 2.1E. Each curved piston is formed to be smoothly displaceable, so as to travel smoothly and recursively through the annular loop defined by the given toroidal chamber 2.1C, 2.1E along the annular axis thereof. As such, each curved piston 4C, 4C', 4C", 4E, 4E', 4E" is configured to substantially fill a portion of the toroidal chamber 2.1C, 2.1E, with a sectional dimension that spans the transaxial (substantially circular in the illustrated embodiment) space of the toroidal chamber, and with outer cylindrical surfaces which substantially conform to the housing component inner walls surrounding the toroidal chamber (though without frictionally engaging them).

Preferably, a layer of liquid or other suitable lubricant is captured between the outer cylindrical surfaces of each curved piston and the toroidal chamber's immediately surrounding cylindrical inner walls. A series of surface grooves, such as the surface grooves 4.2C (illustratively indicated for the curved piston 4C) are preferably formed on the outer cylindrical surface of each curved piston to facilitate suitable lubricant retention and distribution in this regard. The lubricant layer not only lubricates against frictional engagement between the curved pistons and surrounding chamber wall surfaces, it intimately fills and seals off the toroidal chamber space defined at one axial end of a curved piston from the toroidal chamber space defined at the other axial end of that curved piston. The lubricant layer about each curved piston thus serves as a seal between sub-chambers defined to lead and lag that curved piston.

While the sectional, or transaxial, profile of each toroidal chamber 2.1C, 2.1E and of each curved piston 4C, 4C', 4C", 4E, 4E', 4E" is circular in the illustrated embodiment, it may be of other shapes in certain other embodiments suitable for the particular application intended. That is, the planar geometric shape revolved annularly about the axis of each unit's cylinder portion to describe each unit's toroidal chamber 2.1C, 2.1E may be of any suitable shape other than the circular shape shown, depending on the particular requirements of the intended application. Thus, oblong sectional profiles, polygonal profiles, or any other less regular profiles suitable for the intended application may be employed for each toroidal chamber 2.1C, 2.1E, so long as the curved pistons are correspondingly shaped and configured to transaxially fill the toroidal chamber in sealed yet displaceable manner (in conjunction with the applied lubricant layer).

The rotor assembly of each compression/expansion unit 100C, 100E includes a rotor member 6 disposed within the unit's central cavity 1.2C, 1.2E. As shown, each rotor member 6 is formed with a central through opening that aligns eccentrically with the through openings of the adjoining housing components 1C, 2C or 1E, 2E, so as to eccentrically receive the crank shaft 12 therethrough. The annular inner surface of each rotor member 6 immediately surrounding this through opening is preferably formed with at least a portion thereof defining a rotor gear portion providing gear teeth to engage a complementarily toothed gear surface of a stationary gear portion (such as formed on a bearing support 10 described in following paragraphs). The toothed engagement with such stationary gear portion serves to guide a revolving displacement of the rotor member 6 thereabout.

In the embodiment illustrated in FIG. 1, the inner annular surface about the rotor's through opening is preferably formed by two distinct axial sections. One section 6.1C, 6.1E defines a substantially smooth inner annular wall surface which accommodates an eccentric crank disk formed on the crank shaft 12 (as described in following paragraphs). The other section 6.2C, 6.2E is configured with gear teeth to form an endlessly looped, internally toothed ring gear surface along which the rotor member engages and revolves about the stationary gear portion.

The crank shaft 12 which passes through the axially aligned openings of the adjoining housing components in both the compression and expansion units 100C, 100E is coaxially supported in this embodiment at opposing outer sides of the compression and expansion units' cylinder housing covers 2C, 2E by a pair of bearing supports 10. Each bearing support 10 is mounted to a surrounding structure (not shown) via a mounting base 10.1 and includes a substantially tubular stem portion 10.2 axially extending therefrom. The stem portion 10.2 defines an axial bore through which one end of the crank shaft 12 is coaxially passed for rotatable support therein. The stem portion 10.2 in this embodiment terminates at a stationary gear portion 10.3 whose outer surface defines the externally toothed gear surface engaged by the internally toothed ring gear surface of one rotor member 6.

As shown in the exploded view of FIG. 1, one bearing support 10 is coaxially inserted through the opening 2.2C of the compression unit's cylinder housing cover 2C to pass eccentrically into the through opening of that unit's rotor member 6. The other bearing support 10 is conversely passed through the opening 2.2E of the expansion unit's cylinder housing cover 2E to then pass eccentrically into the central through opening of that unit's rotor member 6. When fully in place, the stem portion 10.2 of each bearing support 10 coaxially engages and substantially fills the through opening 2.2C, 2.2E of the given unit's cylinder housing cover 2C, 2E, and the stationary gear portion 10.3 of each bearing support 10 is disposed in gear-meshed, toothed engagement with the rotor gear portion 6.2C, 6.2E of that unit's rotor member 6.

During operation of system 100, the rotor member 6 within each of the compression and expansion units 100C, 100E undergoes eccentric cycloidal displacement about the axis X of the crank shaft 12. It does so within the given unit's central cavity 1.2C, 1.2E. Depending on the unit, this eccentrically revolving displacement of the rotor member 6 either drives or conveys (the force of) the orbital displacement of the curved pistons 4C, 4C', 4C", 4E, 4E', 4E" within the respective toroidal chambers 2.1C, 2.1E, and conversely either conveys (the force of) or drives the crank shaft's rotational/angular displacement.

The gear-meshed engagement of each rotor member 6 to a stationary gear portion, such as provided on a bearing support 10, serves to guide and stabilize such eccentrically revolving displacement of the rotor member 6. Any other suitable measures known in the art may be employed to provide such guiding, stabilizing support for the rotor member's displacement. While this gear-meshed engagement employed in the illustrated embodiment is realized by the rotor gear portion 6.2C, 6.2E forming an internally toothed ring gear surface to surround an externally toothed gear surface formed on the stationary gear portion 10.3 of a corresponding bearing support 10, other configurations may be employed. For example, in certain alternate embodiments where the requirements of the particularly intended application permit, each rotor member 6 may be alternatively equipped with an externally toothed rotor gear portion and a stationary gear portion forming an internally toothed ring gear surface therefor.

The crank shaft 12, as supported by the two bearing supports 10, passes successively through the aligned openings of the compression unit's cylinder housing cover 2C, rotor member 6, and main cylinder housing half 1C, then through the aligned openings of the expansion unit's main cylinder housing half 1E, its rotor member 6, and cylinder housing cover 2E. While the crank shaft 12 remains rotatable relative to the housing components 1C, 2C and 1E, 2E, it is fixedly coupled to both of the compression and expansion units' rotor members 6 for angular displacement therewith. Toward that end, the crank shaft 12 includes at appropriate intermediate points along its axial length first and second crank disks 13 eccentrically disposed thereabout. That is, each crank disk 13 is formed to be rigidly secured to the crank shaft 12 with substantially the same eccentricity about the crank shaft 12 as the central through opening of one of the compression/expansion units' rotor member 6.

In the illustrated embodiment, the rotor members 6 of the compression and expansion units 100C, 100E are preferably oriented in substantially complementary manner, or approximately 180 degrees offset from one another in angular orientation. The rotor members 6 of the compression and expansion units 100C, 100E are preferably also positioned at complementary eccentric positions relative to their respective cylinder portions. The two crank disks 13 are thus eccentrically disposed to be angularly oriented in opposing radial directions mutually offset in angular position by approximately 180 degrees. Each crank disk 13 is configured and positioned on the crank shaft 12 to engage the smooth annular wall portions 6.1C, 6.1E of its corresponding rotor member 6 in one of the compression and expansion units 100C, 100E. Each crank disk 13 is fixedly secured in place within its rotor member 6 by any suitable means known in the art. This ensures that with every angular rotation of the crank shaft 12 about its axis X, there is a full eccentric cycloidal revolution of each unit's rotor member 6.

The rotor member 6 in each of the compression and expansion units 100C, 100E is formed with a predetermined peripheral contour whose edge portions converge at respective apex points. In the exemplary embodiment illustrated in FIG. 1, each rotor member 6 defines three such apex points; and, the rotor member 6 is linked at or about each apex point to one of the curved pistons 4C, 4C', 4C", 4E, 4E', 4E" thereabout via an articulated swing rod member 5. More specifically, the rotor member 6 is pivotally coupled at or about each of its apex points to an inner end of one swing rod member 5 whose outer end is in turn pivotally coupled to a given one of the curved pistons 4C, 4C', 4C", 4E, 4E', 4E". Any suitable measures known in the art may be employed to effect the pivotal coupling at each of the inner and outer ends of a swing rod member 5, with the pivotal coupling at each swing rod member's outer end being suitably accommodated by the annular slot 2.5C, 2.5E formed between the given unit's housing components 1C, 2C and 1E, 2E (for access to a curved piston inside the toroidal chamber).

Preferably, each swing rod member 5 providing the articulated linkage between an apex point of a rotor member 6 and one curved piston 4C, 4C', 4C", 4E, 4E', 4E" is formed with like configuration to preserve the symmetrical counter balancing during concurrent high speed rotation and revolving displacement of various components within the eccentrically offset compression and expansion units 100C, 100E during system operation. The swing rod members 5 may be formed with any structural configuration known in the art suited to the configuration of the rotor member, curved piston, cylinder portion, and other surrounding components. In the exemplary embodiment shown, each swing rod member 5 is formed with inner and outer ends and an intermediate portion extending therebetween arcuately contoured to suitably conform to the curved peripheral edges of each rotor member 6 as shown.

As each rotor member 6 undergoes its articulated, revolutionary displacement with the crank shaft's rotation about the axis X, the swing rod members 5 articulate to either lead (in the case of the compression unit 100C) or follow (in the case of the expansion unit 100E) the respective apex points of the given rotor member 6 to which they are pivotally coupled. The swing rod members' articulated movements in this regard accordingly link the respective displacements of the curved pistons 4C, 4C', 4C", 4E, 4E', 4E" to the displacement of the given rotor member 6.

When the rotary combustion engine system 100 is fully assembled, the housing components 1C, 2C at the compression unit 100C and the housing components 1E, 2E at the expansion unit 100E together capture at each unit a rotor member 6 and a set of swing rod members 5 therebetween. Within each of the compression and expansion units 100C, 100E, therefore, the unit's rotor member 6 and set of swing rod members 5 are captured inside the central cavity 1.2C, 1.2E of its cylinder portion, between the side central wall surfaces there of the opposed housing components 1C and 2C, 1E and 2E. As described in following paragraphs, a sub-chamber defined within the given unit's toroidal chamber 2.1C, 2.1E (between the ends of consecutive curved pistons inside that toroidal chamber) communicates through a segment of the annular slot 2.5C, 2.5E with a portion of the central cavity 1.2C.

In order to seal off that portion of the central cavity 1.2C, 1.2E from other portions of the central cavity—hence, seal off a given sub-chamber from other sub-chambers of the same toroidal chamber 2.1C, 2.1E—suitable scraping/sealing measures are employed on the surfaces of the given unit's rotor and swing rod members 6, 5 immediately opposing an inner wall of either housing component 1C or 2C, 1E or 2E. With suitable lubricating measures employed, each of the rotor 6 and swing rod members 5 then maintain sealed, scraping engagement against the planar side central wall surfaces between which the central cavity 1.2C, 1.2E is defined. The rotor and swing rod members 6, 5 thus serve to variably form and seal off respective sub-cavities (within the central cavity 1.2C, 1.2E), each of which communicates with one sub-chamber variably formed within the surrounding toroidal chamber 2.1C, 2.1E. Each sub-cavity is thereby formed the illustrated embodiment with varying size and configuration during system operation, dynamically bounded by two swing rod members 5 and the peripheral edge of the given rod member 6 extending between the apex points pivotally coupled connected to those swing rod members 5.

Figure 2B:
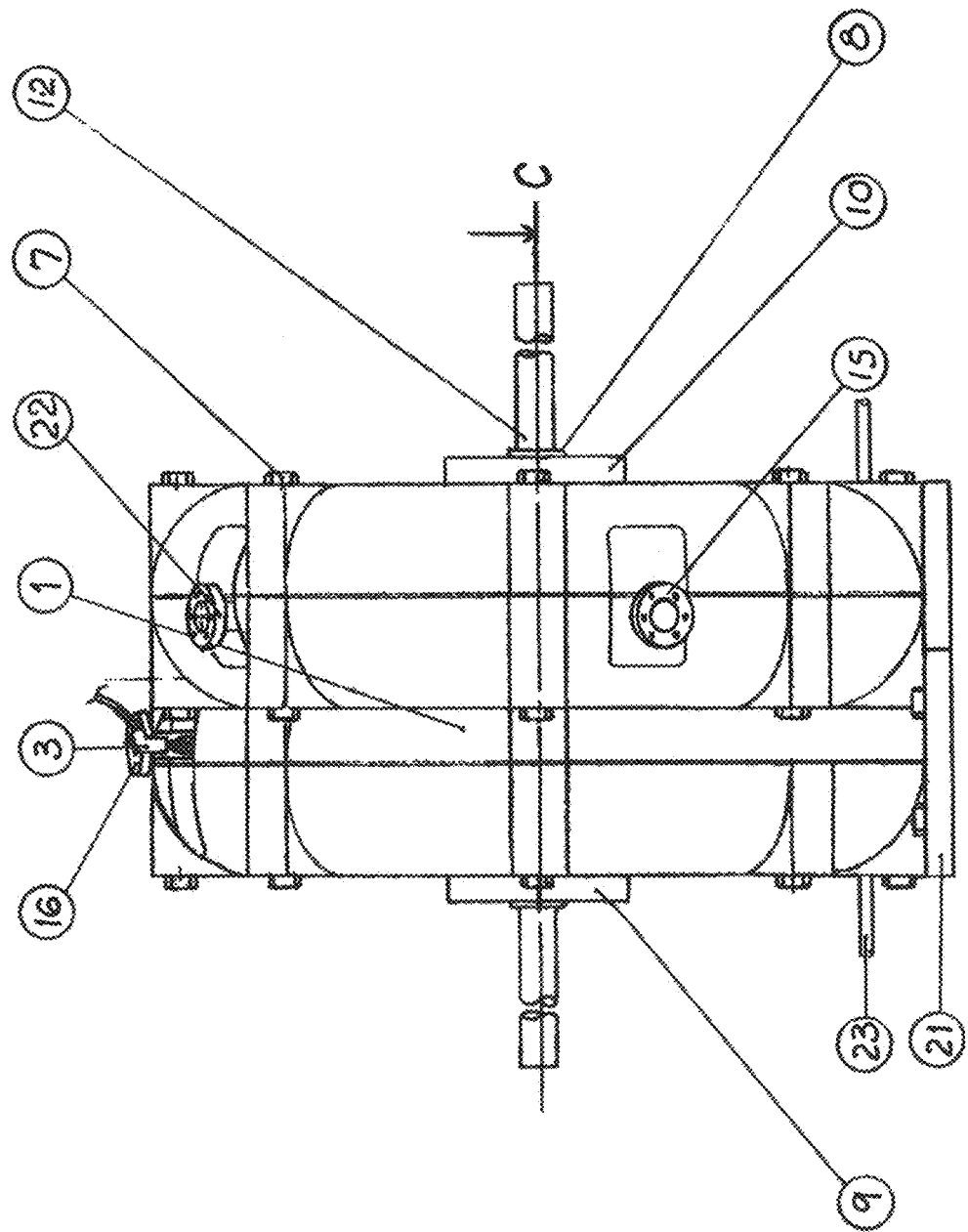
FIG. 2B is a side elevational view of a portion of the embodiment as illustrated in FIG. 1.
Figure 2C:
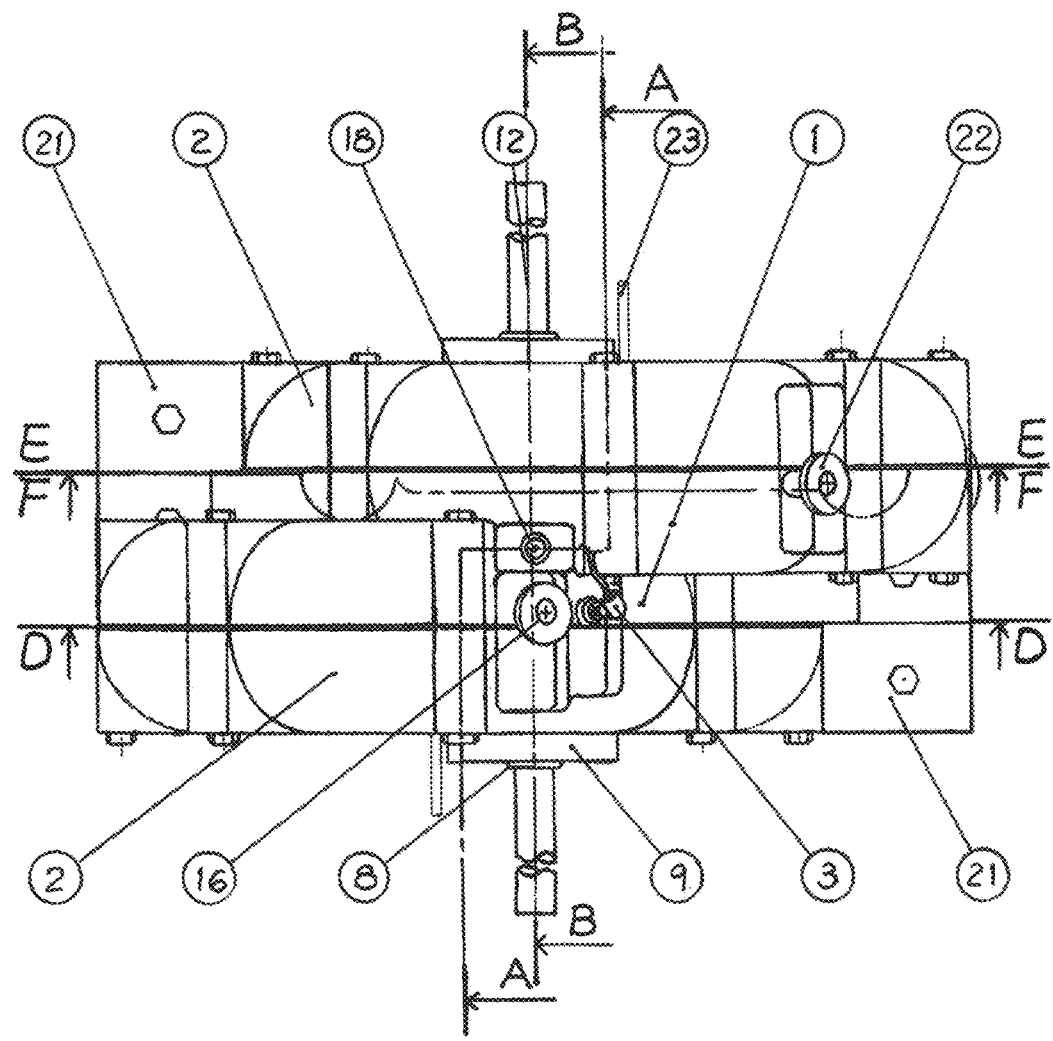
FIG. 2C is a top plan view of a portion of the embodiment as illustrated in FIG. 1.
Figure 3A:
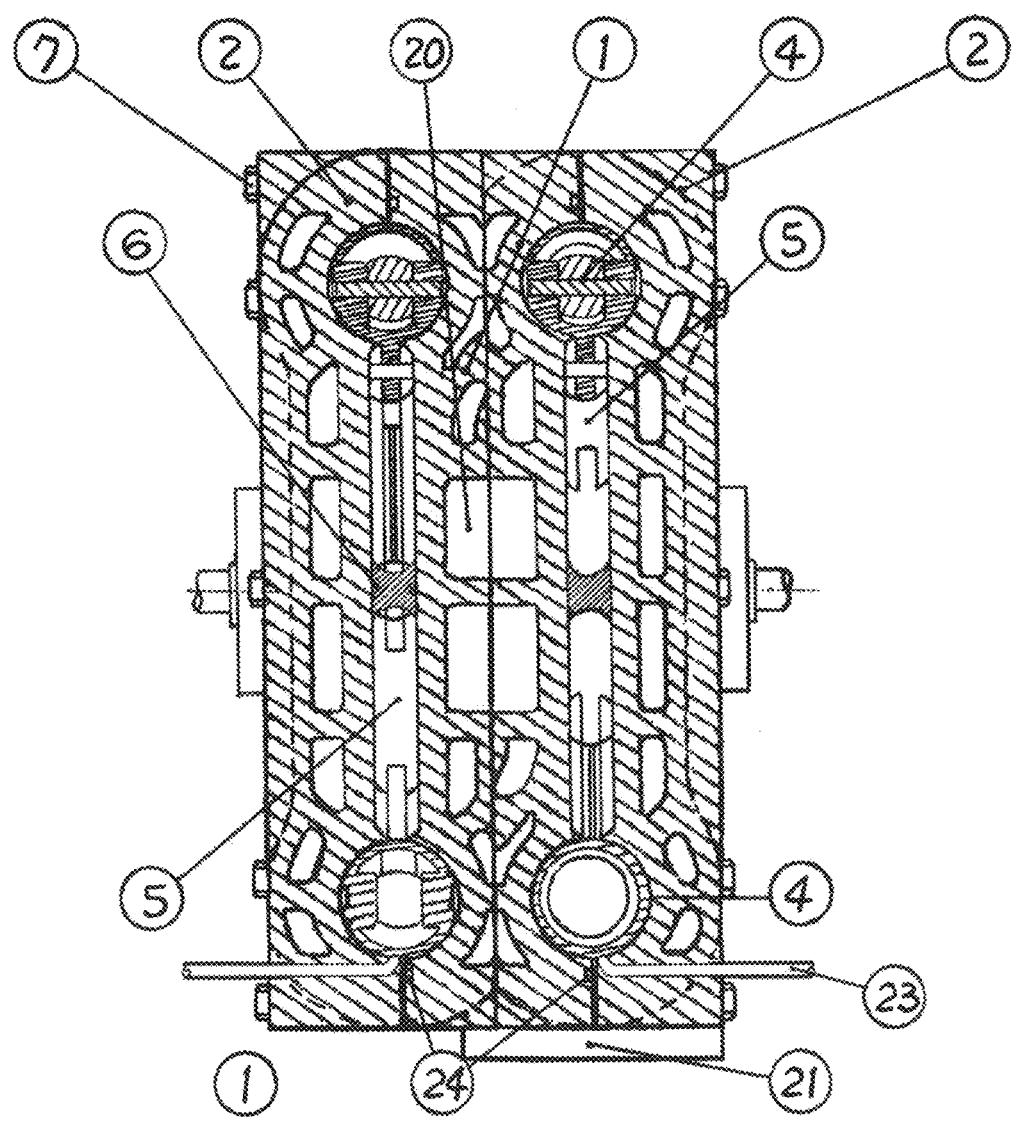
FIG. 3A is a sectional view taken along line A-A of the portion of the system illustrated in FIG. 2C.
Figure 3B:
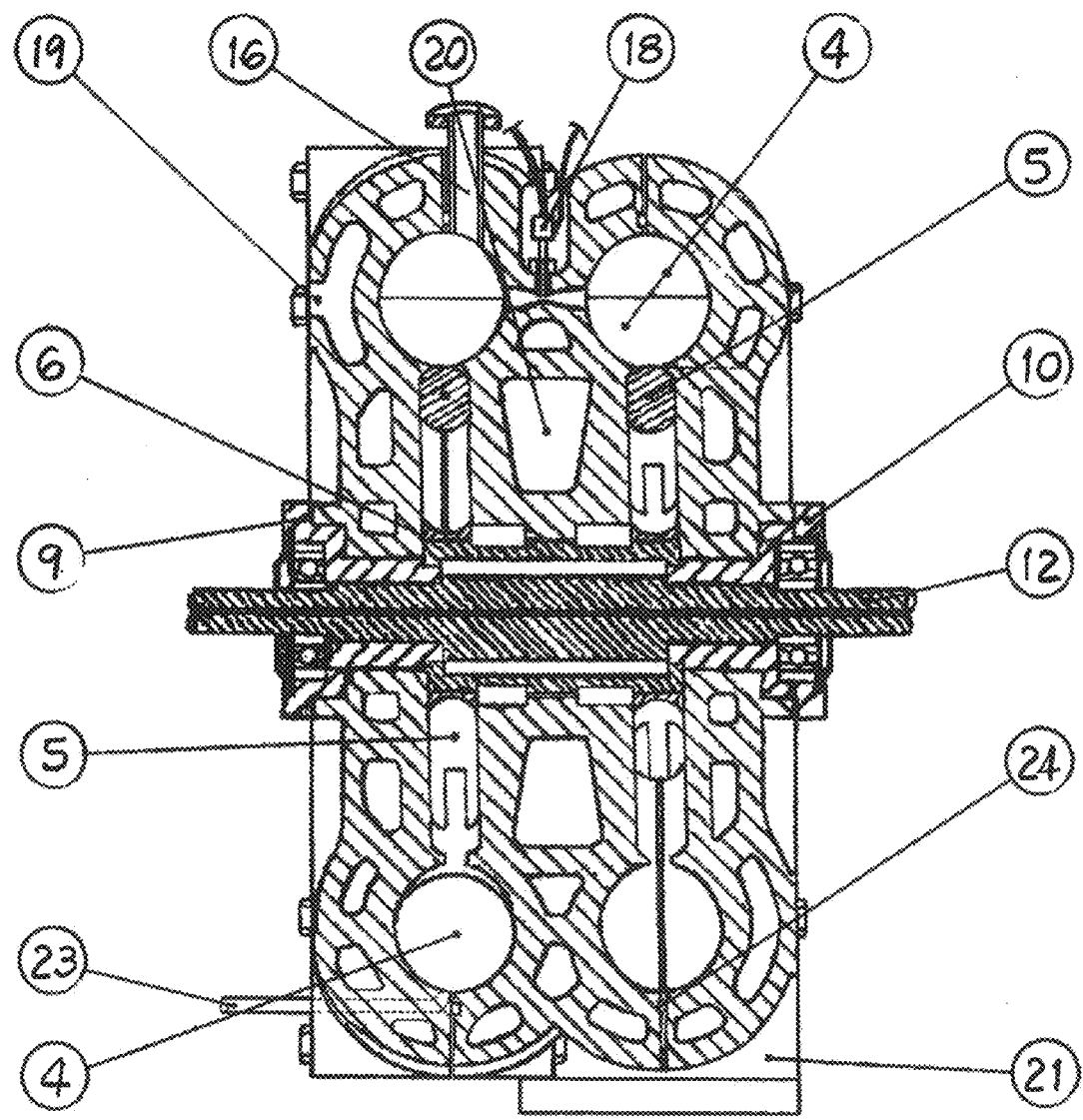
FIG. 3B is a sectional view taken along line B-B of the portion of the system illustrated in FIG. 2C.
Figure 3D:
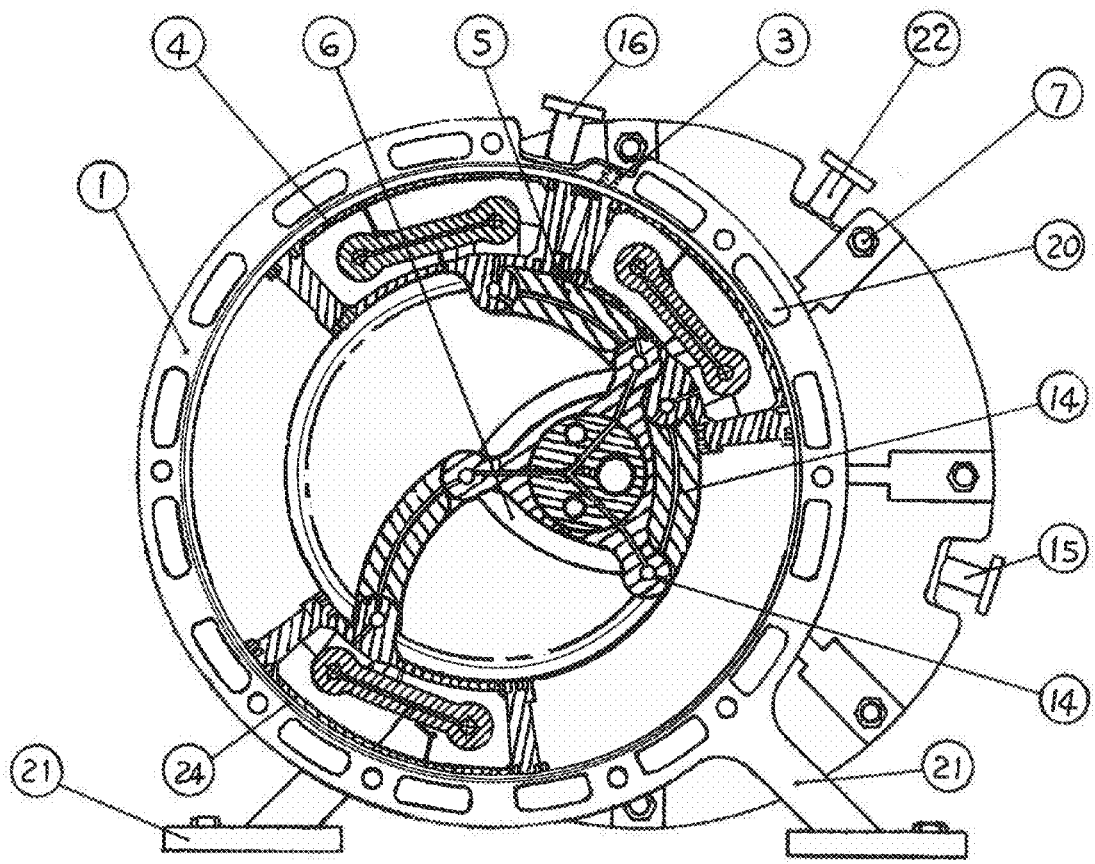
FIG. 3D is a sectional view taken along line D-D of the portion of the system illustrated in FIG. 2C.
Figure 3E:
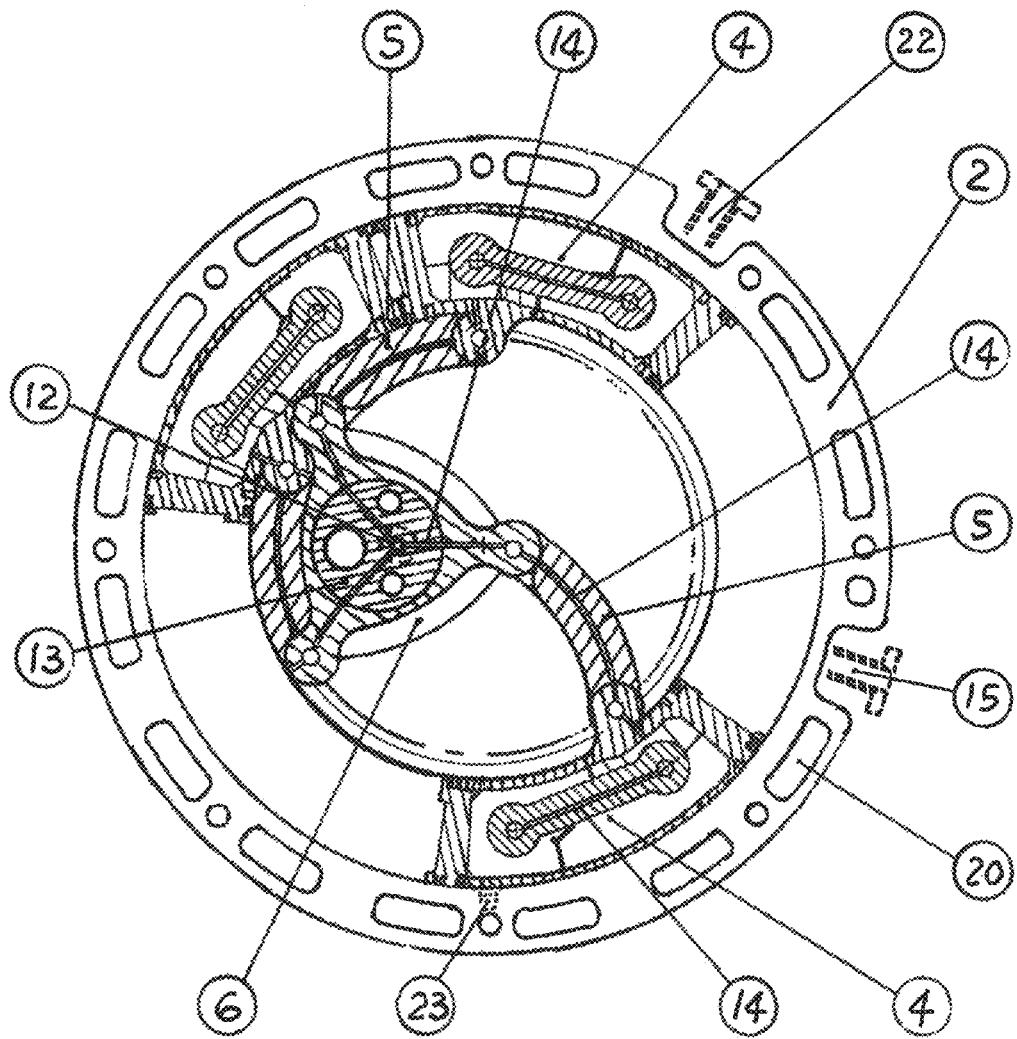
FIG. 3E is a sectional view taken along line E-E of the portion of the system illustrated in FIG. 2C.
Figure 3F:
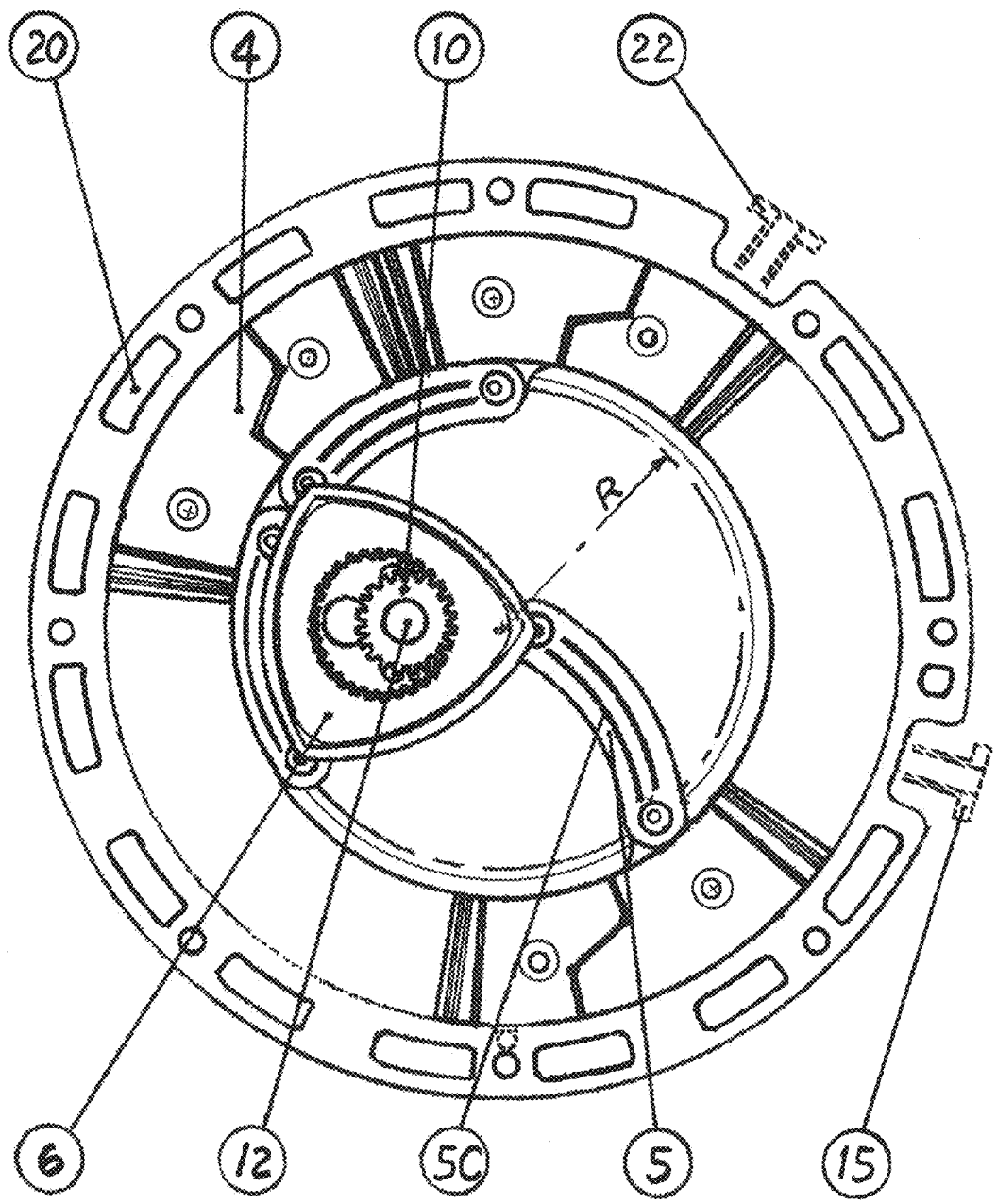
FIG. 3F is a sectional view taken along line F-F of the portion of the system illustrated in FIG. 2C.

FIGS. 2A-2C respectively show front elevational, side elevational, and top plan views of the system 100 as illustrated in FIG. 1, when viewed along the axis X of the crank shaft 12 (from the expansion unit 100E side). FIGS. 3A-3F show various sectional views along different section lines taken through different portions of the system embodiment 100. The different views of FIGS. 2A-3F reveal among other things the various internal cooling and lubricating measures preferably implemented through the system 100. These include internal channels formed through and within the various housing components 1C, 2C and 1E, 2E to maintain safe and stable operating conditions. The coolant distribution channels and compartments running throughout the housing components and the various moving members ultimately communicate with the coolant ports 19 formed through a housing component of one or both of the compression and expansion units 100C, 100E. The various lubricant distribution channels and compartments formed through the housing components and different operational members of the units 100C, 100E ultimately communicate with the lubricant port 23 preferably formed through a housing component of each unit 100C, 100E leading to a lubricant reservoir (not shown). Any suitable measures known in the art may be employed to actuate and control the provision and distribution of the requisite coolant and lubricant.

Certain of the various components and features (some described in more detail in preceding and following paragraphs) incorporated in the particular implementation of the system 100 shown in FIGS. 1-3G-3 are called out by corresponding reference numbers and identified in the listing below. As the typical structure and function of certain components and features are known and readily apparent to those skilled in the art, they are not further described in detail herein.

1 TOROIDAL CYLINDER HOUSING
2 TOROIDAL CYLINDER OUTER COVER
3 SPARK PLUG
4 TWIN CURVED-PISTON SET
5 CURVED ROUND ROD
6 ROUNDED GROOVE-EDGED ROTOR
7 TENSION BOLT
8 OIL SEAL
9 FRONT STATIONARY GEAR/BEARING HOUSING/RETAINING PLATE
10 REAR STATIONARY GEAR/BEARING HOUSING/RETAINING PLATE
11 ANGULAR-CONTACT BEARING
12 CRANK SHAFT
13 ECCENTRIC CRANK DISK
14 LUBE-OIL SYSTEM
15 AIR INLET PORT
16 FUME EXHAUST PORT
17 COMPRESSED AIR SUPPLY
18 FUEL INJECTOR
19 COOLANT PORT
20 COOLANT COMPARTMENT
21 ENGINE BASE BRACKET
22 VACUUM PORT
23 VACUUMED LUBRICANT PORT (TO RESERVOIR)
24 O-RING GASKET/GROOVE
1A ENGINE BASE BODY
2A EXPANSION CHAMBER COVER
2B COMPRESSION CHAMBER COVER
4A CURVED PISTON SET
4B PISTON CONNECTING ROD
4C PISTON WRIST PIN
4D PISTON PIN SNAP RING
4E PISTON COMPRESSION RING
4F PISTON OIL/SCRAPER RING
4G VOID INFILLER
5A CURVED ROUND ROD
5B CURVED ROD WRIST PIN
5C CURVED ROD SIDE OIL SCRAPER/SEAL
5D LINEAR SPRING FOR ROD OIL SCRAPER/SEAL
5E DISH SPRING FOR ROD OIL SCRAPER/SEAL
6A GROOVE EDGED DISK ROTOR SET
6B DISK ROTOR SIDE OIL SCRAPER/SEAL
6C LINEAR SPRING FOR ROTOR OIL SCRAPER/SEAL
9A STATIONARY GEAR
12A ECCENTRIC CRANK SHAFT
14A LUBRICATING OIL PASSAGE

FIG. 3G-1-3G-3 show a series of top-down sectional views of the main cylinder housing halves 1C, 1E with other parts of the system removed but for the crank shaft 12. Preferably, the crank shaft 12 is largely if not entirely formed as one unit given the exceeding loads that it typically encounters during system operation. The views of FIGS. 3G-1-3G-3 illustrate one example of such crank shaft 12, with its eccentrically offset crank disks 13 being assembled for use with the main cylinder housing halves 1C, 1E. The main cylinder housing halves 1C, 1E are formed as shown with a shared intermediate opening 1.25. Each main cylinder housing half 1C, 1E is formed with a recess 1.25C, 1.25E immediately about the shared intermediate opening 1.25 so as to provide sufficient clearance for incrementally guided passage of the crank shaft 12 through such shared opening 1.25.

As illustrated in FIG. 3G-1, for instance, when the crank shaft 12 is installed from the compression unit side as indicated (right to left in the view as shown), the crank shaft's leading eccentric crank disk 14 is first concentrically aligned to fit through the shared intermediate opening 1.25, while its central disk 12.5 is accommodated by the recess 1.25C on the main cylinder housing half 1C side. Upon advancement of the crank shaft 12, the leading eccentric crank disk 14 passes out of the shared intermediate opening 1.25 and into recess 1.25E of the main cylinder housing half 1E. As illustrated in FIG. 3G-2, the crank shaft 12 is thereafter shifted transaxially (translated downward in the view as shown), such that its leading eccentric crank disk 14 is translated within the accommodating recess 1.25E on the main cylinder housing half 1E side. The crank shaft's central disk 12.5 is likewise translated to concentrically align with the shared intermediate opening 1.25. Upon further advancement of the crank shaft 12, as illustrated in FIG. 3G-3, its central disk 12.5 coaxially engages the shared intermediate opening 1.25, with its trailing eccentric crank disk 13 remaining on the main cylinder housing half 1C side. The crank shaft 12 is there suitably positioned in the main cylinder housing 1 for further assembly of system components.

Turning now to FIGS. 4A-4L, there is shown a series of schematic diagrams illustrating the recursive operation of the compression and expansion units 100C, 100E once the internal combustion operation of the system 100 has been started using suitable starting measures (not shown). For clarity of illustration, the compression and expansion units 100C, 100E are shown juxtaposed, with a housing component removed from view (the outer housing cover 2E removed in the case of expansion unit 100E, and the main cylinder housing half 1C removed in the case of compression unit 100C). Other portions of the system 100 are likewise removed from view for clarity of illustration. In actual assembly, of course, the bearing supports 10 shown in the juxtaposed units 100C, 100E would actually be coaxially superimposed one over the other when viewed from a frontal view angle, as they coaxially support the same crank shaft 12. A matched line ML marked through each of the compression and expansion units 100C, 100E indicates the reference along which the transaxially offset units 110C, 100E are actually aligned (in manner) in the system embodiment shown.

Figure 4A:
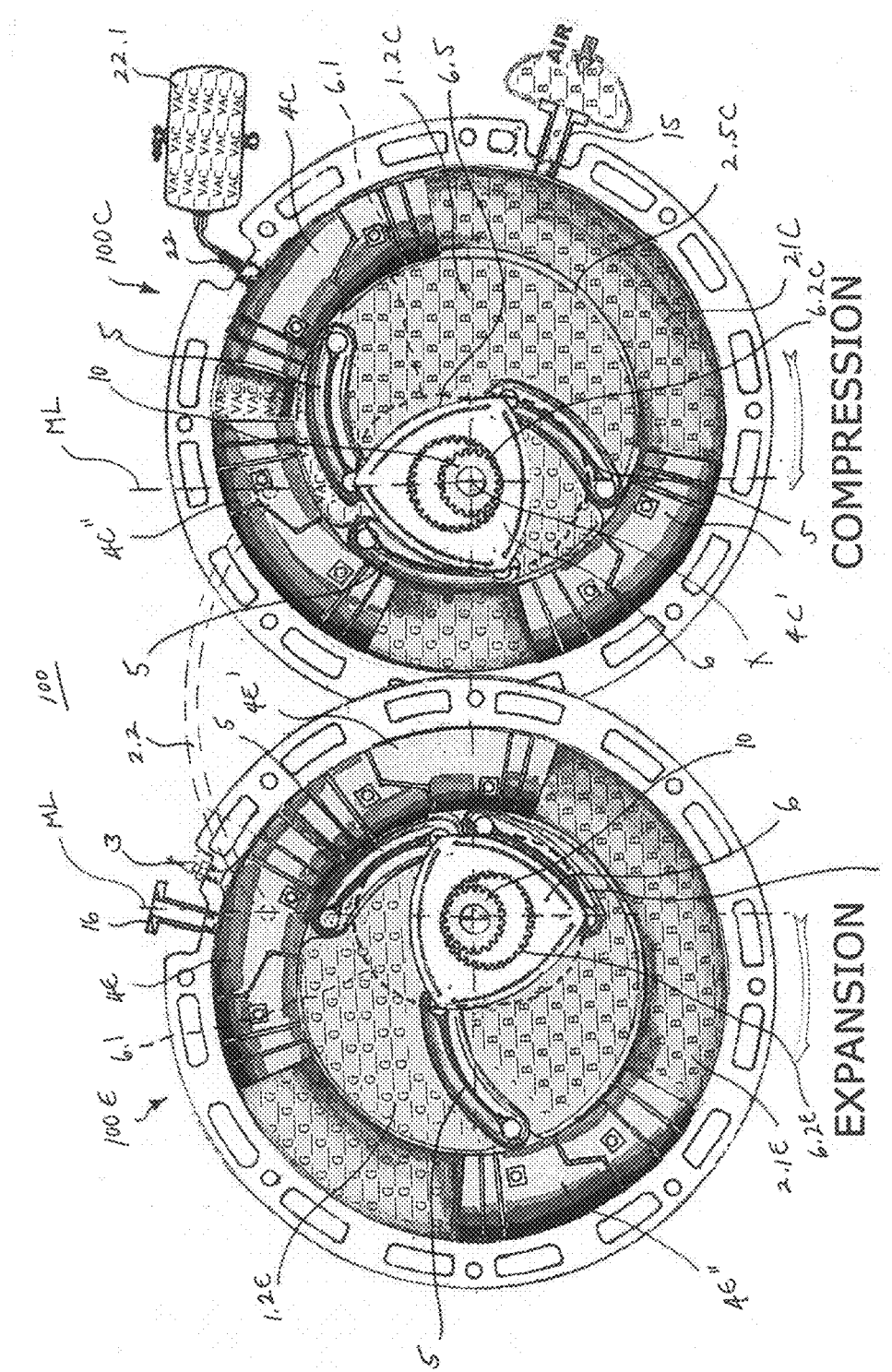
Figure 43:
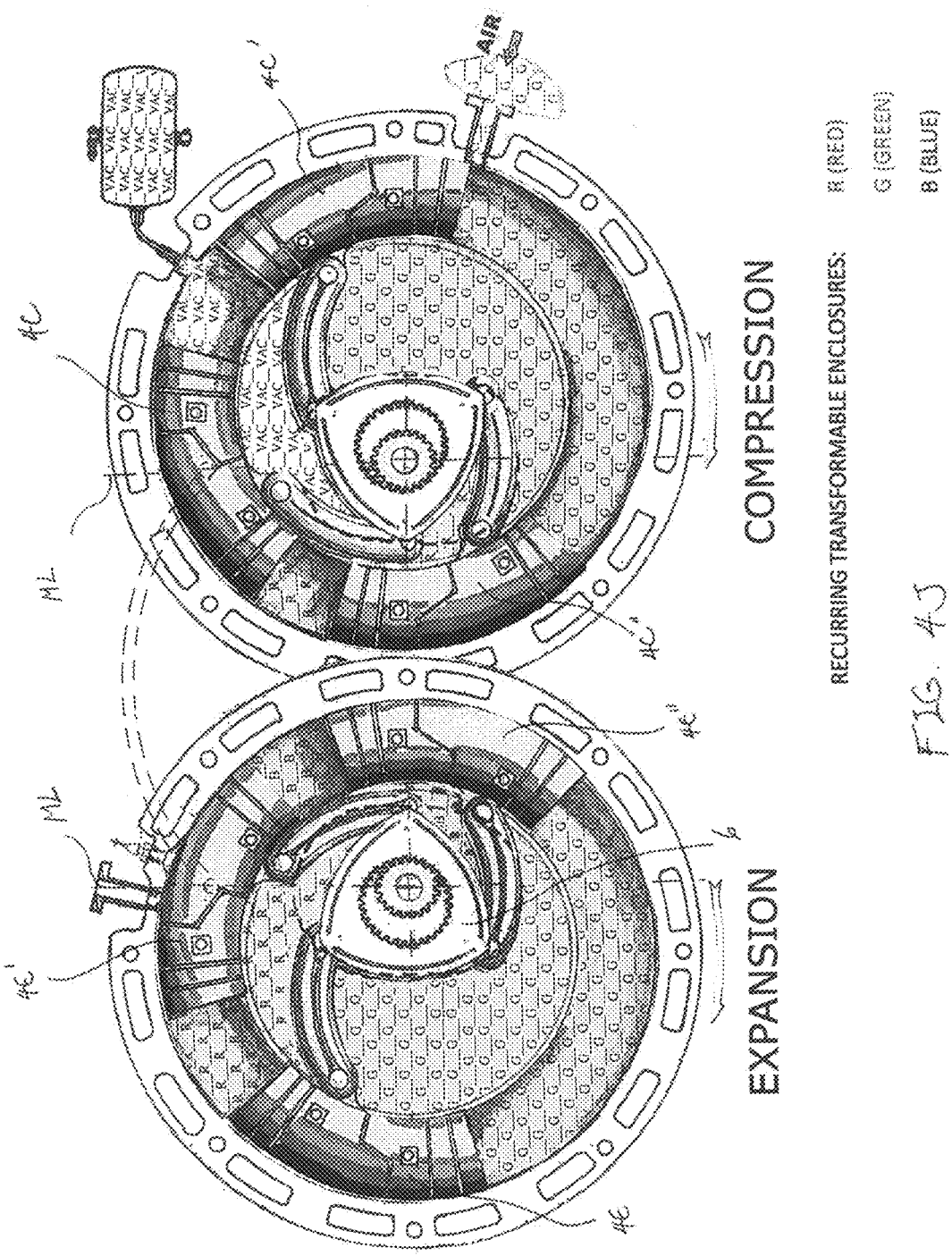

At the instant in time illustrated in FIG. 4A, a batch of freshly introduced air indicated by the letters B occupy one sub-chamber (of the toroidal chamber 2.1C) in the compression unit defined between the curved pistons 4C, 4C'. This batch of air B received through the air inlet 15 in the compression unit 100C also seeps through the exposed segment of the annular slot 2.5C into a sub-cavity (within the central cavity 1.2C) bounded by the two nearest swing rod members 5 and peripheral edge 6.5 of the rotor member 6. A transfer port 2.2 which connects the toroidal chambers 2.1C, 2.1E of the two units is at this point blocked and sealed off by the curved piston 4C" in the compression unit 100C and by the curved piston 4E in the expansion unit 100E. The rotor member 6 of the compression unit 100C is driven along a revolving displacement path 6.1 (as described by the apex points of that rotor 6) by force of the crank shaft rotation imparted by a preceding explosion and expansion cycle(s) occurring in the expansion chamber 100E. The compression unit rotor member 6 is thus turned by the eccentric crank disk 13 of the crank shaft 12 to which it is secured (not shown in FIG. 4A), to revolve around the stationary gear defined by its bearing support 10, guided by its toothed engagement therewith (via its rotor gear portion 6.2C). As the curved pistons 4C, 4C', 4C" linked by the swing rod members 5 follow the rotor member's revolving displacement, they advance at respective rates through the toroidal chamber 2.1C.

At the instant in time illustrated in FIG. 4B, the curved piston 4C follows the rotor member's displacement to begin closing off the air inlet 15 and close the distance with respect to the curved piston 4C', drawing further away from the curved piston 4C". In the meantime, a previously introduced batch of air marked by the letters G and captured in the sub-chamber between the curved pistons 4C' and 4C", as well as between the sub-cavity communicating therewith through an exposed section of the annular slot 2.5C, is further compressed. The sub-chamber defined between the curved piston 4" and 4C is further evacuated through the vacuum port 22 (preferably with the assistance of a suitable vacuum generating unit 22.1 schematically shown coupled to the port 22).

At the time instant illustrated in FIG. 4C, the curved piston 4C in the compression chamber has completely blocked the air inlet 15 while further compressing the batch of air B in the sub-chamber defined against the curved piston 4C'. This in turn has further compressed the batch of air G in the sub-chamber defined by the curved piston 4C' against the curved piston 4C". On the other hand, the evacuated space (marked VAC) formed in the sub-chamber defined between that curved piston 4C" and curved piston 4C is increased in volume. This vacuum continues into the sub-cavity communicating with this sub-chamber through an exposed section of the annular slot 2.5C. At this point, the rotor member 6 has undergone approximately a quarter of its eccentric revolution about the axis X of the crank shaft (and of the stationary gear portion).

Turning to the time instant illustrated in FIG. 4D, the rotor member 6 in each of the units has further advanced in its eccentric revolution such that the curved piston 4C has accordingly advanced past the air inlet 15 in the compression chamber, clearing that air inlet 15 for open communication with the evacuated sub-chamber (and sub-cavity) lagging immediately behind the curved piston 4C. The previously evacuated sub-chamber thus draws a fresh batch of air R in through the now open air inlet 15. This batch of air R fills the sub-chamber as well as the sub-cavity communicating therewith through the exposed section of the annular slot 2.5C there.

Meanwhile, the batch of air B contained within the sub-chamber and sub-cavity leading the curved piston 4C is further compressed by the advancement of curved piston 4C relative to the next curved piston 4C'. At this instant, the batch of air G which had been compressed even further in the next sub-chamber/sub-cavity between the curved piston 4C' and 4C" is exposed to the transfer port 2.2 and passed therethrough to the sub-chamber defined between the curved pistons 4E" and 4E of the expansion unit (and the sub-cavity communicating therewith through an exposed section of the annular slot 2.5E. At this instant, the sub-chamber and sub-cavity defined between the curved pistons 4E" and 4E is quite compact in volume. Nonetheless, the squeezing effect of the compression between the curved pistons 4C' and 4C" of the compression unit forces the compressed batch of air G into the expansion unit's sub-chamber/sub-cavity.

It is within this sub-chamber/sub-cavity of the expansion unit that the compressed batch of air G, mixed with injected fuel, is ignited by suitable ignition measures, such as a spark plug 3. The explosive effect of the resulting internal combustion within the sealed sub-chamber/sub-cavity initiates a dynamic expansion of the volume therein. As schematically illustrated in subsequent FIGS., this generates a repulsive displacing force between the immediately bounding curved pistons 4E" and 4E to accommodate the sub-chamber/sub-cavity volume expansion.

Note as a point of clarity that the batches of gas marked R, B, G elsewhere for illustration within the expansion unit 100E in this FIG. 4D (as well as in FIGS. 4A-4C and 4E-4L) denote post-combustion gases resulting from corresponding batches of compressed air received from the compression unit 100C during successively preceding cycles of compression-combustion-expansion operation. Thus, the batch of gas fumes marked R on the expansion unit 100E side of FIG. 4D do not relate directly to the fresh batch of air R marked on the compression unit 100C side of the figure for the same instant in time. The commonality of marking reflects the fact that such post-combustion gas fumes R resulted from a corresponding batch of compressed air delivered from the compression chamber one full cycle of rotor member 6 revolution (or three compression-combustion-expansion cycles) earlier. This is true for the batch of post-combustion gas fumes marked G shown being expelled out through the fume exhaust port 16 in the expansion unit 100E of FIG. 4D. The batch of gas fumes G resulted from the combustion and expansion of a batch of air G delivered one rotor revolution earlier (or three compression-combustion-expansion cycles earlier) to the expansion unit 100E through the transfer port 2.2.

At the instant in time illustrated in FIG. 4E, the curved piston 4C' of the compression unit 100C has advanced beyond the compression chamber's access opening into the transfer port 2.2, sealing off the same. The sub-chamber/sub-cavity immediately leading that curved piston 4C' (which had been occupied by the compressed batch of air G an instant earlier) now begins to re-open as an evacuated volume with the curved piston 4C" immediately being drawn further ahead by the rotor member 6 and corresponding swing rod member 5. The rotor member 6, of course, is driven to advance through its eccentric revolution by the crank shaft 12 whose rotation is in turn driven by the explosive expansion and responsive displacement of the curved pistons in the expansion unit 100E. The curved piston 4C continues to advance within the compression cylinder portion relative to both its lagging curved piston 4C" and leading piston 4C'. Consequently, the volume of fresh air R introduced through the still-open air inlet 15 behind the curved piston 4C continues to increase, while the batch of previously introduced air B ahead of the curved piston 4C continues to be compressed within the continually compacting volume of the sub-chamber and communicating sub-cavity there.

In the expansion cylinder portion, the post combustion pocket of gas G (between the curved pistons 4E" and 4E) is shown beginning to grow in volume, while the gas R resulting from a combustion cycle earlier continues to expand in volume as well. The pocket of gas fumes B from two combustion cycles earlier has just about reached its maximum expansion and begins to compress somewhat in volume for subsequent exhaustion.

Turning to the instant in time illustrated in FIG. 4F, the evacuated sub-chamber between the curved pistons 4C' and 4C" in the compression chamber now communicates with the vacuum port 22 to be further evacuated with the help of the evacuating measures 22.1 and ongoing separation between the two curved pistons 4C' and 4C". The curved piston 4C" advances to a point where it begins to seal off the air inlet 15, so that the batch of air R in the immediately leading sub-chamber/sub-cavity may begin to compress. The batch of air B farther ahead nears full compression as the curved piston 4C is driven closer to the curved piston 4C'.

In the expansion chamber, the post combustion pocket of gas G continues to expand further, as does the pocket of combustion gas R in the sub-chamber/sub-cavity immediately ahead. The post combustion gas B in the next sub-chamber/sub-cavity is further reduced in volume as it nears the point of exhaustion.

The process continues at the instant in time illustrated in FIG. 4G, where the rotor member 6 in each of the compression and expansion units 100C, 100E has undergone approximately half of its eccentric revolution about the axis X of the crank shaft 12. At this instant in time, the curved piston 4C" in the compression chamber has advanced to the point where it continues to seal off the air inlet 15. The pocket of air B in the compression sub-chamber shown is very near full compression for subsequent transfer to the expansion chamber.

At the next instant in time illustrated in FIG. 4H, the curved pistons 4C, 4C', 4C" have respectively advanced with the rotor member 6 in the compression chamber such that the air inlet 15 is opened once again to communicate with the previously evacuated sub-chamber and sub-cavity between the curved pistons 4C' and 4C". A fresh batch of air G is consequently drawn in to fill the evacuated volume through the air inlet 15. Meanwhile, the fully compressed batch of air B is advanced to the point where it communicates with the transfer port 2.2, so as to be drawn therethrough into the sub-chamber/sub-cavity defined in the expansion chamber between the curved pistons 4E' and 4E", for ignition and combustion there. The pocket of post combustion gas B which had occupied the expansion chamber (from three combustion cycles earlier) is exhausted out through the fume exhaust port 16 at that or another suitable time. This is much the scenario which had occurred a combustion cycle earlier, at the time instant illustrated in FIG. 4D.

The process illustrated in FIGS. 4E-4H recurs for the next cycle of compression and expansion within the sub-chambers/sub-cavities of the compression and expansion chambers until the next transfer and ignited combustion of compressed air illustrated in FIG. 4L. By the instant in time illustrated in that FIG. 4L, the rotor member 6 in each of the compression and expansion units has advanced approximately $\frac{7}{8}^{th}$ of its eccentric revolution in this embodiment. Further progression of the process would advance the rotor member 6 in each of the compression and expansion units on through to full revolution for recurrence of the scenario illustrated in FIG. 4A.

Such recursive operation concurrently within the compression and expansion units 100C, 100E carried out at various rates of revolutions (RPM) yields a symbiotic drive of the crank shaft 12. While the direction of rotor member and curved piston revolutions is shown for simplicity of explanation occurring in one direction (the clockwise direction in FIGS. 4A-4L) within the illustrated embodiment, system 100 may be operated in other embodiments and/or applications with such revolutions occurring in the opposite angular direction. In addition, the synchronization of curved piston movements within each of the compression and expansion chambers may be varied depending on the particular requirements of the intended application and/or embodiment at hand. The particular configuration and synchronization of components represented in FIGS. 4A-4L are shown for illustrative purposes; and, the present invention is not limited in configuration/synchronization thereto.

Referring now to FIGS. 5A-5C, there are shown respective sets of plan, outer elevational, sectional, and inner elevational views for different housing components in isolation, as formed in accordance with another exemplary embodiment of the present invention. The components in this embodiment are similar to those shown in FIGS. 1-4L, but are shown with minor variations to suit a particularly intended application.

FIG. 5A illustrates in isolation the various views for an expansion unit's cylinder housing cover 202E defining one half of the toroidal expansion chamber 202.1E. As shown, the toroidal chamber 202.1E encircles a central cavity 201.2E and communicates therewith through an annular slot 202.5E that is preserved when the cylinder housing cover 202E is adjoined to the main cylinder housing half 201E of a central housing 201 (shown in FIG. 5C). The central cavity 201.2E is defined at the inner side of a substantially planar central wall surface that is solid and uninterrupted except at a through opening 202.2E which coaxially admits the stem portion of a bearing support and the crank shaft.

FIG. 5B similarly shows the various views of the compression unit's cylinder housing cover 202C which defines one half of the toroidal compression chamber 202.1C encircling a central cavity 201.2C communicating therewith through an annular slot 202.5C that is formed when the cylinder housing cover 202C is adjoined to the main cylinder housing half 201C of the central housing 201 (FIG. 5C). The cylinder housing cover 202C is also formed with a planar central wall which encloses the central cavity 201.2C (against the main cylinder housing half 201C). This central wall is preferably solid and uninterrupted except at the through opening 202.2C which coaxially passes the stem portion of a bearing support and the crank shaft.

FIG. 5C illustrates the various views of the central housing 201 in isolation. This central housing has main cylinder housing halves 201E and 201C for the expansion and compression chambers. As in the embodiment of FIG. 1, the main cylinder housing halves 201E and 201C are formed with coaxially aligned through openings 202.2 (which in turn align coaxially with the through opening 202.2E and 202.2C of the expansion and compression cylinder housing covers). Each main cylinder housing half 201E, 201C is thus eccentrically disposed with reference to the through opening 202.2 and the crank shaft which passes therethrough. Yet they respectively define the inner halves of the toroidal expansion and compression chambers 202.1E and 202.1C which are correspondingly disposed eccentric to the through openings 202.2.

Figure 6:
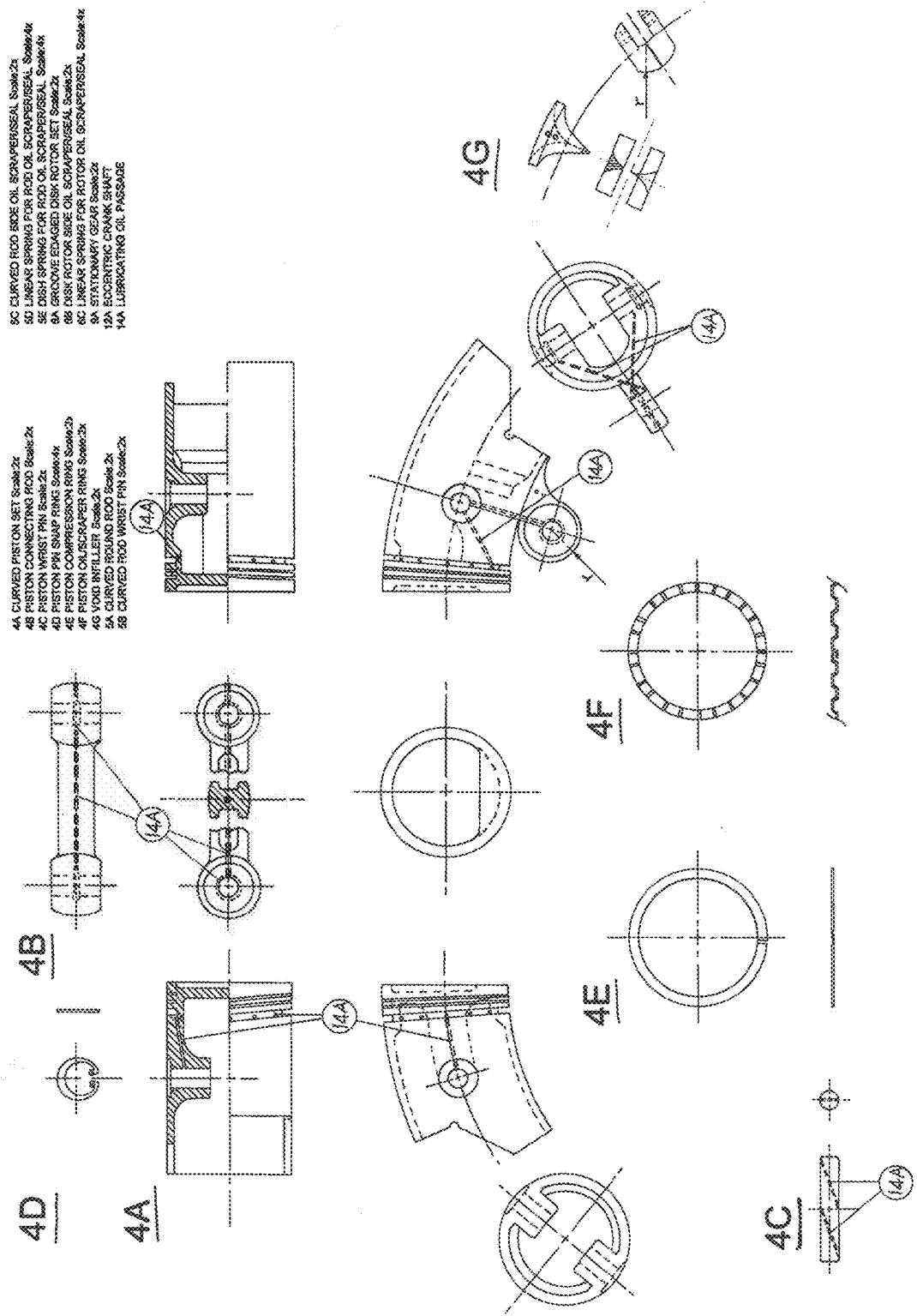
FIG. 6 shows various views of a curved piston set components used within the housing components of the exemplary embodiment illustrated in FIGS. 5A-5C.
Figure 7:
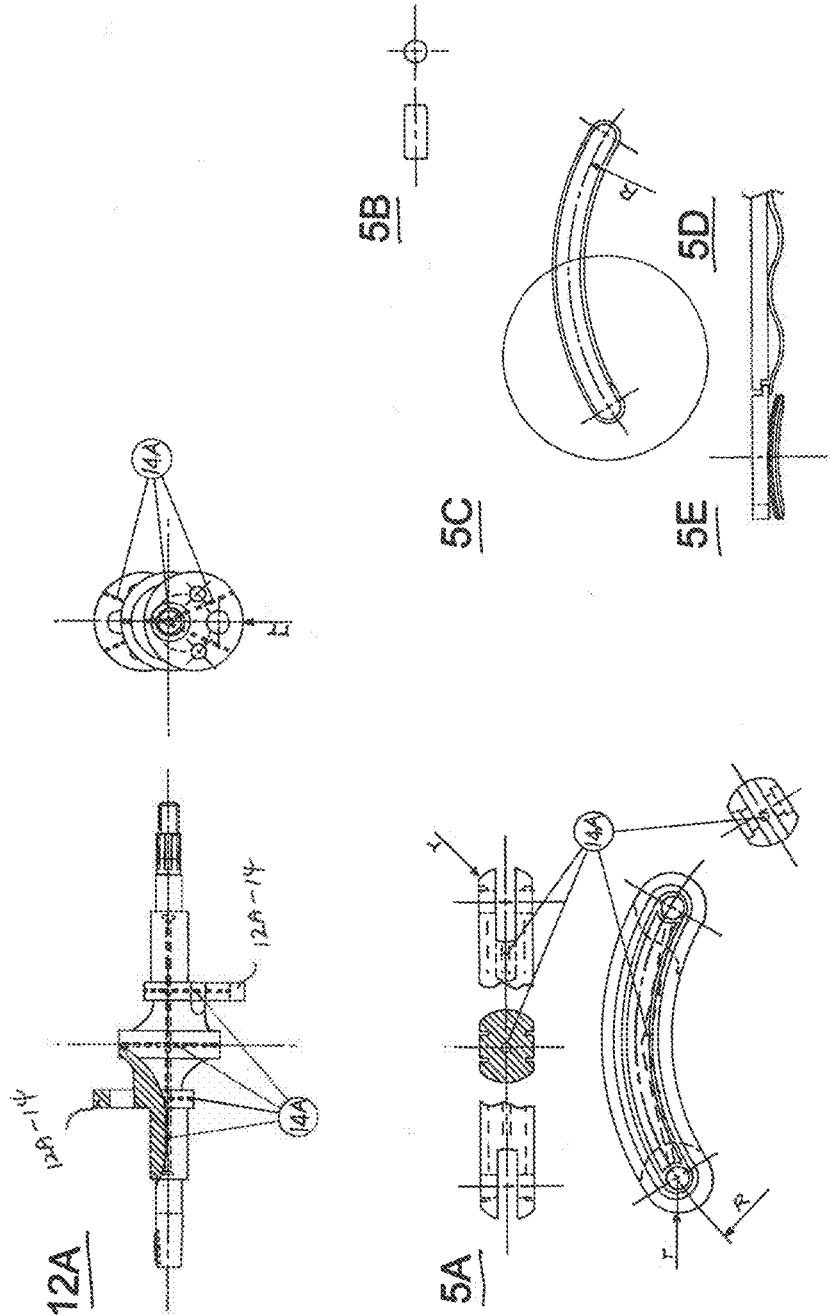
FIG. 7 shows various partially cut away views of a crank shaft, a curved round rod, and lubricant oil scraping/sealing members for a curved round rod used within the housing components of the exemplary embodiment illustrated in FIGS. 5A-5C; and, FIG. 8 shows various inner and outer elevational views, as well as partially sectioned side elevational views, of both a rotor member and stationary gear bearing support used within the housing components of the exemplary embodiment illustrated in FIGS. 5A-5C.
Figure 8:
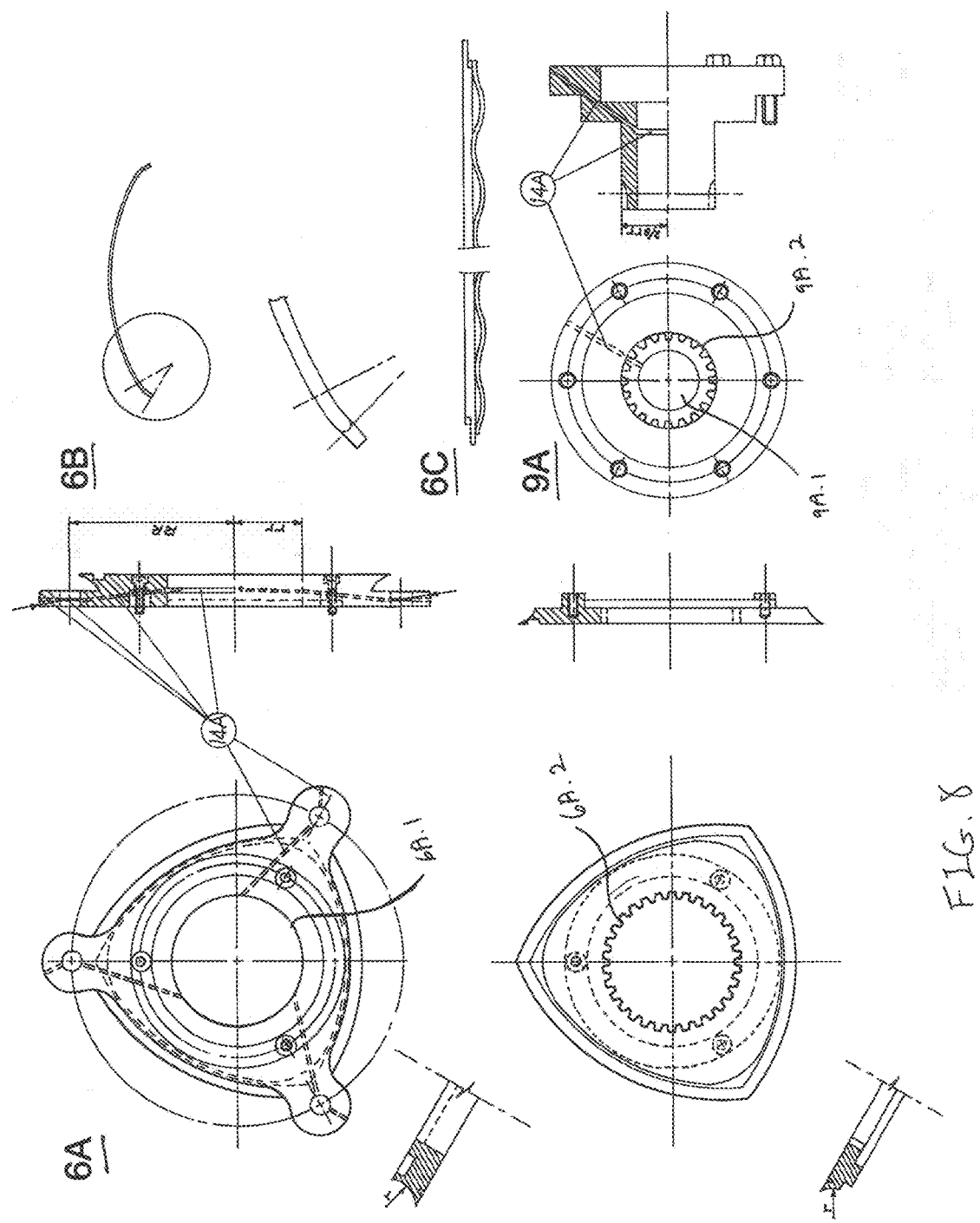

Referring to FIGS. 6-8, there are shown more detailed views of various other components used within the housing components formed in accordance with the embodiment illustrated in FIGS. 5A-5C. FIG. 6 illustrates various views of a curved piston set 4A whose parts may be assembled and displaceably disposed without one of the expansion and compression chambers 202.1E, 202.1C. As shown, the curved piston set 4A is preferably formed with a network of lubricating oil passages 14A. The piston set is coupled to a plurality of piston connecting rods 4B through which a portion of the lubricating oil passage network 14A is also formed. Portions of the curved piston set and/or the piston connecting rod 4B are joined together by one or more piston wrist pins 4C and piston pin slap rings 4D. As the curved piston set 4E substantially fills a segment of the toroidal expansion/compression chamber within which it is disposed, it is equipped with one of more annular piston compression rings 4E and piston oil/scraper rings 4F which serve to trap and 'scrape' a lubricant along the immediately surrounding inner wall surfaces of the toroidal chamber during the piston set's seal-preserving movement therein. One or more void infillers 4G are suitably employed to help guide the lubricant in such manner that the sealed yet smoothly displaceably engagement between the curved piston set and the toroidal chamber's surrounding walls is preserved.

FIG. 7 illustrates different, partially cut away views of a crank shaft 12A, a curved round rod 5A (used as a swing rod linkage member between a curved piston set and a rotor member), and lubricant oil scraping/sealing members for use on the curved round rod 5A. As shown, the crank shaft 12A is formed with a pair of eccentric crank disk 12A-14 respectively secured to corresponding rotor members within the expansion and compression units. The crank shaft 12A and each curved round rod 5A are preferably also formed with lubricating oil passages 14A for continuing the system's lubricant oil passage network. The oil scraping/sealing measures include a linear spring 5D applied on that side of each curve round rod immediately facing the side central planar wall of a toroidal cylinder housing cover 202E or 202C (enclosing the central cavity 201.2E or 201.2C within which the curved round rod 5A is disposed). The scraping/sealing measures preferably also include a dish spring 5E at an end portion as shown which, together with the linear spring 5D, provides sufficient scraping action against the toroidal housing cover's sidewall to trap lubricant thereagainst, and thereby preserve smooth yet sealed displacement along that sidewall. Also shown in FIG. 7 is a curved rod wrist pin 5B employed for pivotally coupling one end of the curved round rod to a rotor member and the other end to a curved piston set.

Referring now to FIG. 8, there are shown various inner and outer elevational views, as well as partially sectioned side elevational views of both a groove-edged disk rotor set 6A and a stationary gear bearing support 9A to which it is engaged. Both the rotor set and stationary gear bearing support 6A, 9A are preferably formed with respective lubricating oil passages 14A which contribute to the system's overall lubricating oil passage network. Preferably, an outer axial side of each groove-edged disk rotor set 6A is formed with three radially protruding portions which collectively define three pivotal coupling apex points. Visible from this side is the peripheral profile of a smooth annular wall portion 6A.1 which securely receives therein one eccentric crank disk 12A-14 of the crank shaft 12A.

Visible from the opposing outer axial side of the groove-edged disk rotor set 6A is a toothed rotary gear portion 6A.2 concentrically disposed with respect to the smooth annular wall 6A.1. This outer axial side of the rotor set 6A and defines an oil scraper/seal formation on which one or more linear springs 6C are disposed for trapping a lubricant against the immediately opposing planar sidewall surface of the given cylinder housing cover 202E or 202C. The linear spring 6C, along with sufficient amount of lubricated oil, forms a scraping engagement of that planar wall surface to enable smooth yet sealed displacement thereagainst.

The stationary gear bearing support 9A includes a central stem portion defining a substantially tubular contour about a cylindrical bore 9A.1 through which the crank shaft 12A is coaxially passed. The outer surface of this substantially tubular stem portion forms an externally toothed gear surface 9A.2 configured to enmesh the toothed inner surface of the rotor gear portion 6A.2. The greater diameter rotor gear portion 6A.2 then advances along the toothed surface 9A.2 of the stationary gear's stem in gear-engaged revolving manner along an eccentric cycloidal displacement path. Each of the rotor member's apex points revolves about the axis of the crank shaft 12A accordingly.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A rotary combustion engine system comprising:
an axially extended shaft;
at least one compression chamber and at least one expansion chamber offset therefrom, said at least one compression chamber and said at least one expansion chamber communicating through a transfer port defined therebetween, said at least one compression chamber having at least one air intake coupling port, and said at least one expansion chamber unit having at least one exhaust coupling port; and
a housing assembly enclosing said at least one compression chamber and said at least one expansion chamber, said housing assembly having a fuel introduced therethrough for ignition in said at least one expansion chamber;
wherein said at least one compression chamber and said at least one expansion chamber including further include:
a cylinder portion defining a toroidal chamber space extending annularly about a central cavity;
a plurality of curved pistons disposed within said toroidal chamber space to be displaceable relative to one another therein, the plurality of said curved pistons variably partitioning said toroidal chamber space into a plurality of sub-chamber spaces sealed one from the other; and
a rotor disposed within the central cavity of said cylinder portion eccentrically coupled to said axially extended shaft and linked by a plurality of swing rods to the plurality of said curved pistons;
wherein the plurality of said curved pistons of said at least one expansion chamber are incrementally advanced through said toroidal chamber space by recursive combustion within the plurality of said sub-chamber spaces defined therebetween, said rotor member of said at least one expansion chamber unit being angularly displaced responsive to an advancement of the plurality of said curved pistons for incrementally driving rotation of said axially extended shaft about an axis thereof; and
wherein said rotor member of said at least one compression chamber is angularly displaced responsive to the rotation of said axially extended shaft to incrementally advance the plurality of said curved pistons through said toroidal chamber space for recursive compression of air within said sub-chamber spaces defined therebetween, compressed air being recursively passed through said transfer port to the plurality of said sub-chamber spaces of said at least one expansion chamber.

2. The rotary combustion engine system as recited in claim 1, wherein said toroidal chamber space of said at least one compression chamber is axially and transaxially offset from said toroidal chamber space of said at least one expansion chamber, and
wherein said at least one compression chamber and said at least one expansion chamber are coupled eccentrically to said axially extended shaft passing through the central cavity thereof.

3. The rotary combustion engine system as recited in claim 2, wherein said axially extended shaft defines a crank shaft, the system including first and second crank disks each eccentrically disposed about said crank shaft, and
wherein said rotor of said at least one compression chamber and said at least one expansion chamber are secured to said crank shaft respectively by said first and second crank disks.

4. The rotary combustion engine system as recited in claim 1, wherein said rotor of said at least one compression chamber and said at least one expansion chamber are is formed with a through opening receiving said axially extended shaft eccentrically therethrough, and
wherein said rotor of said at least one compression chamber and said at least one expansion chamber includes peripheral edge portions converging at respective apex points to collectively define a predetermined peripheral contour about the through opening.

5. The rotary combustion engine system as recited in claim 4, wherein each of the plurality of said swing rods of said at least one compression chamber and said at least one expansion chamber includes an inner end portion, an outer end portion, and an intermediate portion extending therebetween,
wherein said inner end portion is pivotally coupled to one of said apex points of said rotor, and said outer end portion is pivotally coupled to one of the plurality of said curved pistons.

6. The rotary combustion engine system as recited in claim 5, further comprising:
a plurality of bearing supports extending respectively into the central cavities of said at least one compression chamber and said at least one expansion chamber, each of the plurality of said bearing supports defining a stationary gear;
wherein each said rotor of said at least one compression chamber and said at least one expansion chamber includes a rotor gear engaging said stationary gear of one of the plurality of said bearing supports to guide eccentric cycloidal displacement of said rotor about the axis of said axially extended shaft.

7. The rotary combustion engine system as recited in claim 6, wherein one of said rotor gear and said stationary gear defines an internally toothed ring gear surface extending about an externally toothed gear surface defined by the other.

8. The rotary combustion engine system as recited in claim 7, wherein:

each of the plurality of said bearing supports coaxially receives and rotatably supports said axially extended shaft, and has a tubular end forming said externally toothed gear surface; and
said rotor gear forms said internally toothed ring gear surface about said through opening of one said rotor to extend eccentrically about said tubular end of one of the plurality of said bearing supports.

9. The rotary combustion engine system as recited in claim 7, wherein:
each of said peripheral edge portions of said rotor and the plurality of said swing rods maintains slidably sealed engagement with surrounding wall surfaces of said housing assembly;
said rotor and a pair of the plurality of said swing rods extend therefrom thereby variably partitioning the central cavity within each of said at least one compression chamber and said at least one expansion chamber into a plurality of sub-cavities sealed one from the other; and
each of the plurality of sub-cavities is in open communication with one of the plurality of said sub-chamber spaces variably formed within a surrounding said toroidal chamber space of said at least one compression chamber and said at least one expansion chamber.

10. The rotary combustion engine system as recited in claim 9, further comprising a plurality of deflectable spring seals respectively coupled to extend along each of the plurality of said swing rods and along each of said peripheral edge portions of said rotor.

11. The rotary combustion engine system as recited in claim 7, wherein:
said rotor of said at least one compression chamber and said at least one expansion chamber includes three apex points with said peripheral edge portions extending bulbously therebetween; and
said intermediate portion of each of the plurality of said swing rods extends arcuately between said inner end portion and said outer end portion.

12. A rotary combustion engine system comprising:
an axially extended crank shaft; and
at least one compression chamber and at least one expansion chamber disposed within a housing assembly, said at least one compression chamber and said at least one expansion chamber communicating through a transfer port defined therebetween, said at least one compression chamber having at least one air intake port, said at least one expansion chamber being coupled to a fuel source and having at least one exhaust port and at least one spark plug coupling; and said at least one compression chamber and said at least one expansion chamber further including:
a cylinder portion defining a toroidal chamber space extending annularly about a central cavity;
a plurality of curved pistons disposed within said toroidal chamber space in separately displaceable manner, the plurality of said curved pistons variably partitioning said toroidal chamber space into a plurality of sub-chamber spaces sealed one from the other;
a rotor disposed within the central cavity of said cylinder portion eccentrically coupled to said axially extended crank shaft and linked by a plurality of swing rods to the plurality of said curved pistons, wherein said rotor including includes a rotor gear portion; and
a plurality of bearing supports extending through said housing assembly and respectively into the central cavity of said at least one compression chamber and the central cavity of said at least one expansion chamber to coaxially receive and rotatably support said axially extended crank shaft, wherein each of the plurality of said bearing supports defines a stationary gear engaging said rotor gear of one said rotor to guide eccentric cycloidal displacement thereof about an axis of said axially extended crank shaft passing through the central cavity of said at least one compression chamber and the central cavity of said at least one expansion chamber;

wherein said toroidal chamber space of said at least one compression chamber is axially and radially offset from said toroidal chamber space of said at least one expansion chamber;

wherein the plurality of said curved pistons of said at least one expansion chamber is incrementally advanced through said toroidal chamber space by recursive combustion within the plurality of said sub-chamber spaces defined therebetween;

wherein said rotor of said at least one expansion chamber is angularly displaced responsive to an advancement of the plurality of said curved pistons for incrementally driving rotation of said axially extended crank shaft about an axis thereof; and wherein said rotor member of said at least one compression chamber being angularly displaced responsive to the rotation of said axially extended crank shaft to incrementally advance the plurality of said curved pistons through said toroidal chamber space for recursive compression of air within the plurality of said sub-chamber spaces defined therebetween, compressed air being recursively passed through said transfer port to one of the plurality of said sub-chamber spaces of said at least one expansion chamber for combustion thereat.

13. The rotary combustion engine system as recited in claim 12, wherein said rotor of said at least one compression chamber and said at least one expansion chamber are formed with a through opening receiving said axially extended crank shaft eccentrically therethrough; and wherein said rotor of said at least one compression chamber and said at least one expansion chamber includes peripheral edge portions converging at respective apex points to collectively define a predetermined peripheral contour about the through opening.

14. The rotary combustion engine system as recited in claim 12, wherein each of the plurality of said swing rods of said at least one compression chamber and said at least one expansion chamber includes an inner end portion, an outer end portion, and an intermediate portion extending therebetween, wherein said inner end portion is pivotally coupled to one of said apex points of said rotor, and said outer end portion is pivotally coupled to one of the plurality of said curved pistons.

15. The rotary combustion engine system as recited in claim 12, wherein:

each of the plurality of said bearing supports includes a tubular end forming an externally toothed gear surface; and said rotor gear forms an internally toothed ring gear surface centered within said predetermined peripheral contour thereof to extend eccentrically about said tubular end of one of the plurality of said bearing supports.

16. The rotary combustion engine system as recited in claim 13, further comprising a plurality of deflectable spring seals respectively coupled to extend along each of said swing rods and along each of the plurality of said rotor member peripheral edge portions, wherein:

each of said peripheral edge portions of said rotor and the plurality of said swing rods each maintains slidably sealed engagement with surrounding wall surfaces of said housing assembly;

said rotor and a pair of the plurality of said swing rods extend therefrom thereby variably partitioning the central cavity within each of said at least one compression chamber and said at least one expansion chamber into a plurality of sub-cavities sealed one from the other; and each of the plurality of said sub-cavities is in open communication with one of the plurality of said sub-chamber spaces variably formed within a surrounding said toroidal chamber space.

17. The rotary combustion engine system as recited in claim 16, wherein:

said rotor of said at least one compression chamber and said at least one expansion chamber includes three apex points with said peripheral edge portions extending bulbously therebetween; and said intermediate portion of each of the plurality of said swing rods extends arcuately between said inner portion and said outer end portion.

18. A rotary internal combustion engine system comprising:

an axially extended crank shaft;

a housing assembly having a fuel injector and a spark plug; and at least one compression chamber and at least one expansion chamber offset therefrom, said at least one compression chamber and said at least one expansion chamber communicating through a transfer port defined therebetween, said at least one compression chamber having at least one air intake port, said at least one expansion chamber having at least one exhaust coupling port;

wherein said at least one compression chamber and said at least one expansion chamber include:

a cylinder portion defining a toroidal chamber space extending annularly about a central cavity;

a plurality of curved pistons disposed within said toroidal chamber space to be displaceable relative to one another therein, the plurality of said curved pistons variably partitioning said toroidal chamber space into a plurality of sub-chamber spaces sealed one from the other; and a rotor disposed outside said toroidal chamber space of said cylinder portion, said rotor being eccentrically coupled to said axially extended crank shaft and linked by articulated swing rods to the plurality of said curved pistons;

wherein the plurality of said curved pistons of said at least one expansion chamber are incrementally advanced through said toroidal chamber space by recursive combustion within said sub-chamber spaces defined therebetween;

wherein said rotor of said at least one expansion chamber is angularly displaced responsive to displacement of the plurality of said curved pistons within said toroidal chamber space for incrementally driving rotation of axially extended crank shaft about an axis thereof; and wherein said rotor of said at least one compression chamber is angularly displaced responsive to the rotation of said axially extended crank shaft to incrementally displace the plurality of said curved pistons within said toroidal chamber space for recursive compression of air within the plurality of said sub-chamber spaces defined therebetween, compressed air being recursively passed through said transfer port to the plurality of said subchamber spaces of said at least one expansion chamber.

19. The rotary internal combustion engine system as recited in claim 18, wherein said at least one compression chamber includes at least one vacuum coupling communicating with said toroidal chamber space thereof.

20. The rotary internal combustion engine system as recited in claim 18, wherein each of said rotor and the plurality of said swing rods includes at least one scraper applied thereon for slidably sealed engagement of a housing inner wall surface enclosing the central cavity.

* * * * *